United States Patent [19]
Burch et al.

[11] Patent Number: 5,372,540
[45] Date of Patent: Dec. 13, 1994

[54] ROBOT CUTTING SYSTEM

[75] Inventors: Ronald H. Burch, Harahan; Mark E. Sutton, Kenner; Soumitra Sengupta, New Orleans; Warren E. Cancienne, Jr., River Ridge, all of La.; Bernard Bretagnolle, Grenoble, France; James D. Arthur, Costa Mesa

[73] Assignee: The Laitram Corporation, Harahan, La.

[21] Appl. No.: 90,815

[22] Filed: Jul. 13, 1993

[51] Int. Cl.5 .............................................. A22C 17/02
[52] U.S. Cl. ........................................ 452/156; 83/53; 83/581
[58] Field of Search ................. 452/157, 156, 158; 83/370, 371, 177, 581, 53, 72

[56] References Cited

U.S. PATENT DOCUMENTS

| | | | |
|---|---|---|---|
| Re. 33,917 | 5/1992 | Lapeyre et al. | 452/158 |
| 3,089,775 | 1/1960 | Lindall | 99/107 |
| 3,593,370 | 7/1971 | Lapeyre | 17/52 |
| 3,594,191 | 2/1969 | Lapeyre | 99/111 |
| 3,675,273 | 7/1972 | Vidjak | 17/61 |
| 3,800,363 | 4/1974 | Lapeyre | 17/52 |
| 3,978,748 | 9/1976 | Leslie et al. | 83/53 |
| 4,020,528 | 5/1977 | Lindbladh et al. | 17/50 |
| 4,217,679 | 8/1980 | Gordon | 17/46 |
| 4,520,702 | 6/1985 | Davis et al. | 83/71 |
| 4,557,019 | 12/1985 | Van Devanter et al. | 17/52 |
| 4,651,476 | 3/1987 | Marx et al. | 51/410 |
| 4,669,229 | 6/1987 | Ehlbeck | 51/410 |
| 4,726,094 | 2/1988 | Braeger | 17/54 |
| 4,738,004 | 4/1988 | Lapeyre | 17/52 |
| 4,847,954 | 7/1989 | Lapeyre et al. | 17/54 |
| 4,868,951 | 9/1989 | Akesson | 17/54 |
| 4,875,254 | 10/1989 | Rudy et al. | 17/61 |
| 4,962,568 | 10/1990 | Rudy et al. | 17/52 |
| 5,061,221 | 10/1991 | Holzhüter et al. | 452/184 |

FOREIGN PATENT DOCUMENTS 889787 2/1962 United Kingdom .

*Primary Examiner*—Willis Little
*Attorney, Agent, or Firm*—James T. Cronvich

[57] ABSTRACT

A computer-controlled robot cutting system for making angled or beveled cuts along a preselected path in a workpiece having a generally planar cutting surface. A cutting knife, such as a high-intensity fluid jet, is pivotably mounted in a support frame having two pairs of arcuate guides disposed at right angles to each other for motor-driven rotation of the cutting knife about orthogonal axes. The centers of curvature of both guides lie on a critical plane containing a pivot point about which the cutting knife pivots. An opposing workpiece gantry with horizontal and vertical slides for motor-driven translation of the workpiece along two axes also includes means for holding the workpiece such that its surface to be cut faces the cutting knife and lies in the critical plane. The workpiece is thus translated to define the cutting path on the obverse surface, while the cutting knife is pivoted to define the entry angle of the cut along the cutting path. Four motion controllers under computer control coordinate the motors driving each axis of rotation or translation. Because the obverse cutting surface of the workpiece is maintained in the critical plane containing the pivot point, pivoting of the knife does not change its entry point in the cutting surface, thereby simplifying motion control algorithms. Furthermore, because the cutting knife is pivoted and the workpiece is translated, the relatively massive gearing and movable frame structures are distributed between the cutting knife section and the workpiece gantry, lowering the inertia and enabling the use of lighter-duty motors.

30 Claims, 17 Drawing Sheets

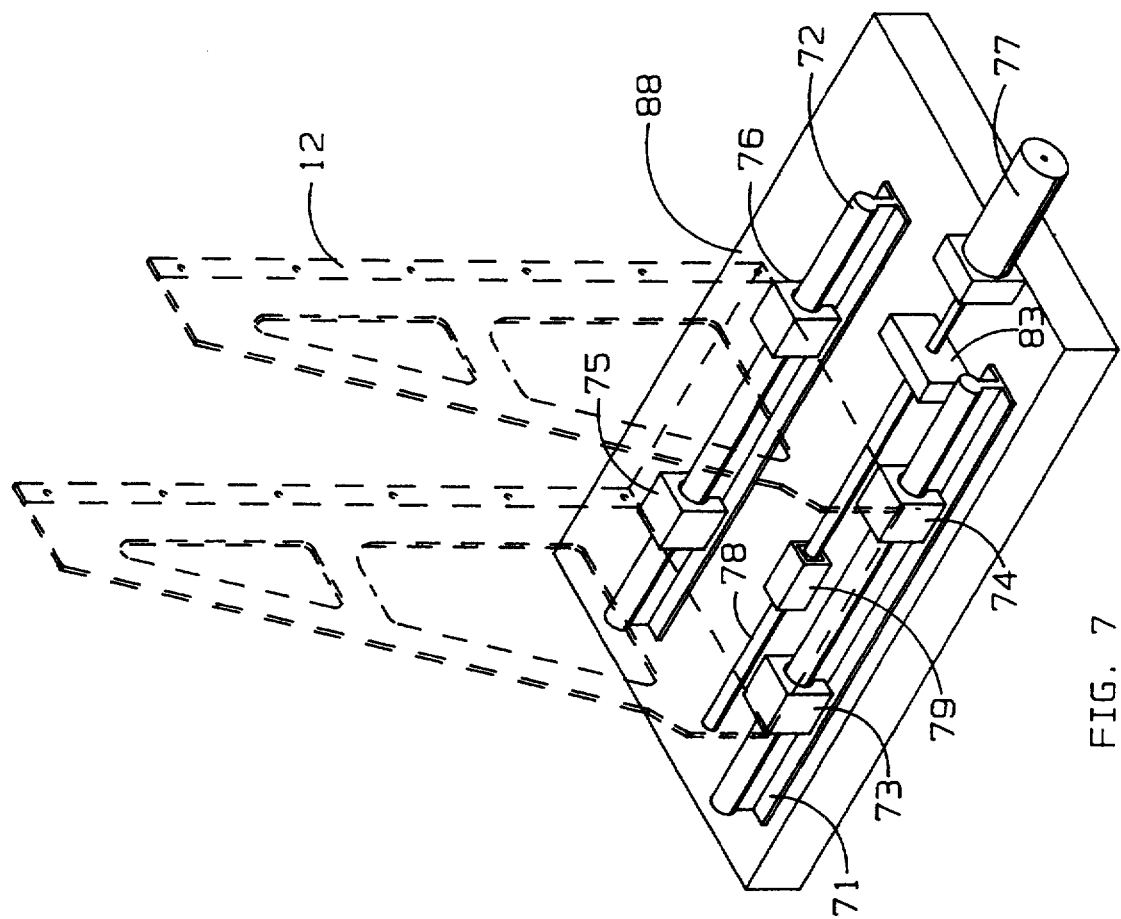
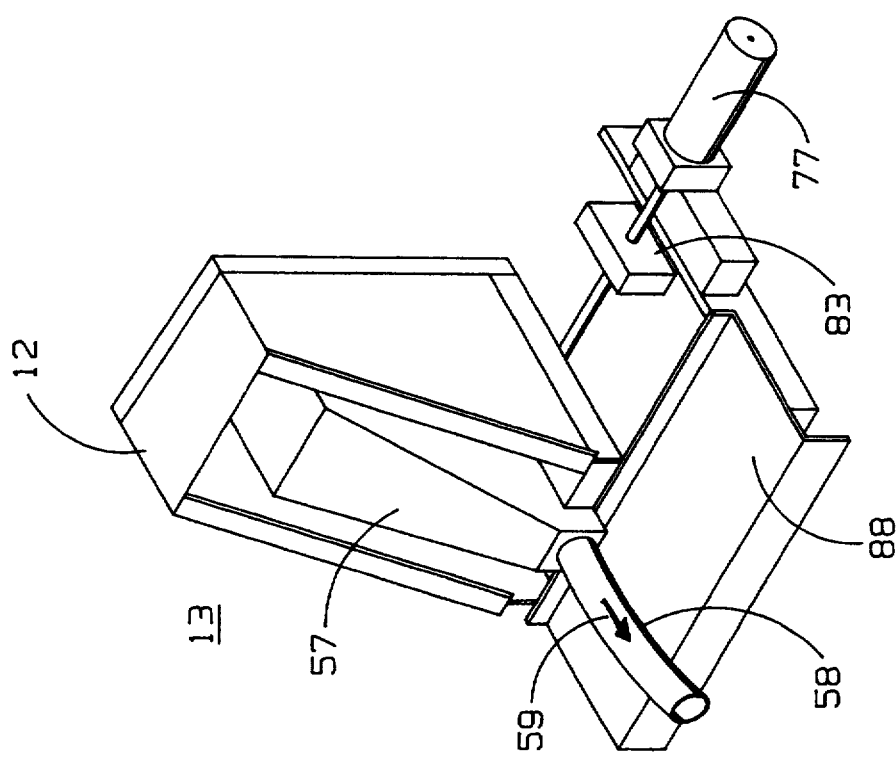
FIG. 7
FIG. 6

ROBOT CUTTING SYSTEM

FIELD OF THE INVENTION

The invention relates generally to the field of robot cutting and, more particularly, to cutting systems for making a beveled cut in a workpiece along a preselected path by means of computer-controlled motion controllers for coordinating the translation and rotation of the workpiece relative to a cutting knife, such as one emitting a high-speed fluid stream, wherein the motion controllers control the path and entry angle of the knife along a surface of the workpiece.

BACKGROUND OF THE INVENTION

Cutting tools that operate by directing a high-intensity energy source such as a high-speed fluid stream along a cutting path in a workpiece are used in many industrial applications to cut various patterns. In simple cutting tools of this kind, the fluid stream is emitted from a stationary nozzle and the workpiece translated to produce the desired cutting path. A similar effect can be achieved by maintaining the workpiece in position and translating the nozzle. Often, it is necessary to make a beveled or angled cut in a workpiece. To produce a beveled cut, the nozzle must be pivoted with respect to the workpiece to change the angle of entry of the fluid jet as it advances along the cutting path. Coordination of translation and pivotal rotation is essential to fast, accurate cutting.

In the field of tuna fish processing, for example, the completely or partly automated cutting of frozen slabs of tuna to remove blood meat and skin portions from edible loin meat portions is described in three U.S. Pat. Nos. (3,800,363; 4,738,004; and Re. 33,917) to James M. Lapeyre and assigned to the assignee of this application. Besides discussing the cutting of tuna slabs along irregular paths, the patents also describe scanners for producing images of one or both sides of the slabs from which control signals are generated to control the cutting apparatus. The two older patents (U.S. Pat. Nos. 3,800,363 and 4,738,004) discuss general methods of visioning and cutting tuna slabs with few details of the conversion of the electrical signals representing the cutting path as determined by the video scan into control signals for the cutting apparatus. Reissued patent Re. 33,917 shows a water jet robot relatively movable with respect to the stationary slab to be cut. None of the patents addresses the problem of achieving fast and accurate cutting paths.

The water jet nozzle on the water jet robot shown in Re. 33,917 is at the end of a sequence of pivot joints having long and massive connecting arms that are unwieldy and slow, exhibiting a lot of inertia, which is detrimental to the rapid direction changes needed for cutting irregular paths and to the overall fast throughput required on a production line. Furthermore, more energy is consumed in powering the motors driving the heavy arms of the robot.

Another shortcoming of the Re. 33,917 robot, which is a standard commercial robot used in many manufacturing fields besides tuna processing and water-jet cutting, is that the pivotal motion provides translation as well as rotation of the water jet with respect to the workpiece. As such, the pivoting of one joint can cause a translation that must be compensated for by pivoting other joints. Consequently, a complex control algorithm is required to coordinate the rotation and translation of the nozzle with respect to the workpiece.

Thus, an object of the present invention is to provide a cutting system capable of rapidly producing beveled cuts in a workpiece in an energy-efficient manner suitable for production-line applications.

SUMMARY OF THE INVENTION

The invention solves the prior art problems and shortcomings and meets its objectives by providing a method and apparatus for producing beveled cuts in a workpiece having a first substantially planar outer surface and a second outer surface parallel to the first. The apparatus includes a cutting knife on a first frame and means for holding the workpiece to a second frame with a planar obverse surface of the workpiece facing the cutting knife. Pivotal motion of the knife with respect to the workpiece is achieved by fixing the pivot point of the pivotal motion at the entry point of the knife on the obverse surface of the workpiece. The entry point is adjusted according to the entrance cutting path on the obverse surface of the workpiece by relative translation of the knife with respect to the workpiece. In this way, translation and pivoting are uncoupled and easily controlled by a controller that generates translation and rotation signals according to the preselected cutting path and entry angle at each point along the path and sends the signals to means for effecting translation and pivotal rotation.

In a preferred embodiment, the cutting device includes a cutting knife, such as one emitting a high-speed fluid stream, or jet, from a nozzle, capable of being pivoted about two independent axes. The workpiece is held firmly in place on a frame comprising a pair of orthogonal slides for translating the workpiece relative to the knife in a fixed plane to define an entry point for the knife on the obverse planar surface. Pivoting is provided by two orthogonally oriented pairs of arcuate guides on the first frame. The centers of curvature of the arcuate guides lie on a cutting plane coincident with the plane of the obverse surface of the workpiece held in position on the second frame. In this way, translation adjusts the entry point and pivoting adjusts the angle of entry or, equivalently, the exit point of the knife on the reverse surface of the workpiece. By translating the workpiece and pivoting the nozzle of the fluid jet, supporting mass is distributed across two frames and smaller motors can be used for each axis of motion. Thus, cutting can be rapid, accurate, and energy-efficient.

Motion controllers in the preferred embodiment provide signals to stepper motors according to preselected entrance and exit cutting paths or entry angles stored in the memory of a controlling computer. The path data can be either standard for cutting a group of identical patterns in a plurality of identical workpieces or custom for each workpiece, as for irregular workpieces. Alone or in conjunction with an imaging system capable of producing a two-dimensional array of surface attribute values from which the computer can be programmed to determine cutting paths and entry angles, the preferred cutting apparatus is designed for automated operation.

BRIEF DESCRIPTION OF THE DRAWINGS

In the accompanying drawings, wherein like features are given similar reference characters in the several views to facilitate comparison:

FIG. 6 is a rear perspective view of the workpiece gantry of FIG. 5;

FIG. 7 is a partial perspective view of the workpiece gantry of FIG. 5 showing the gantry frame in phantom and the horizontal slide rail portion;

DETAILED DESCRIPTION OF THE INVENTION

Figure 1:
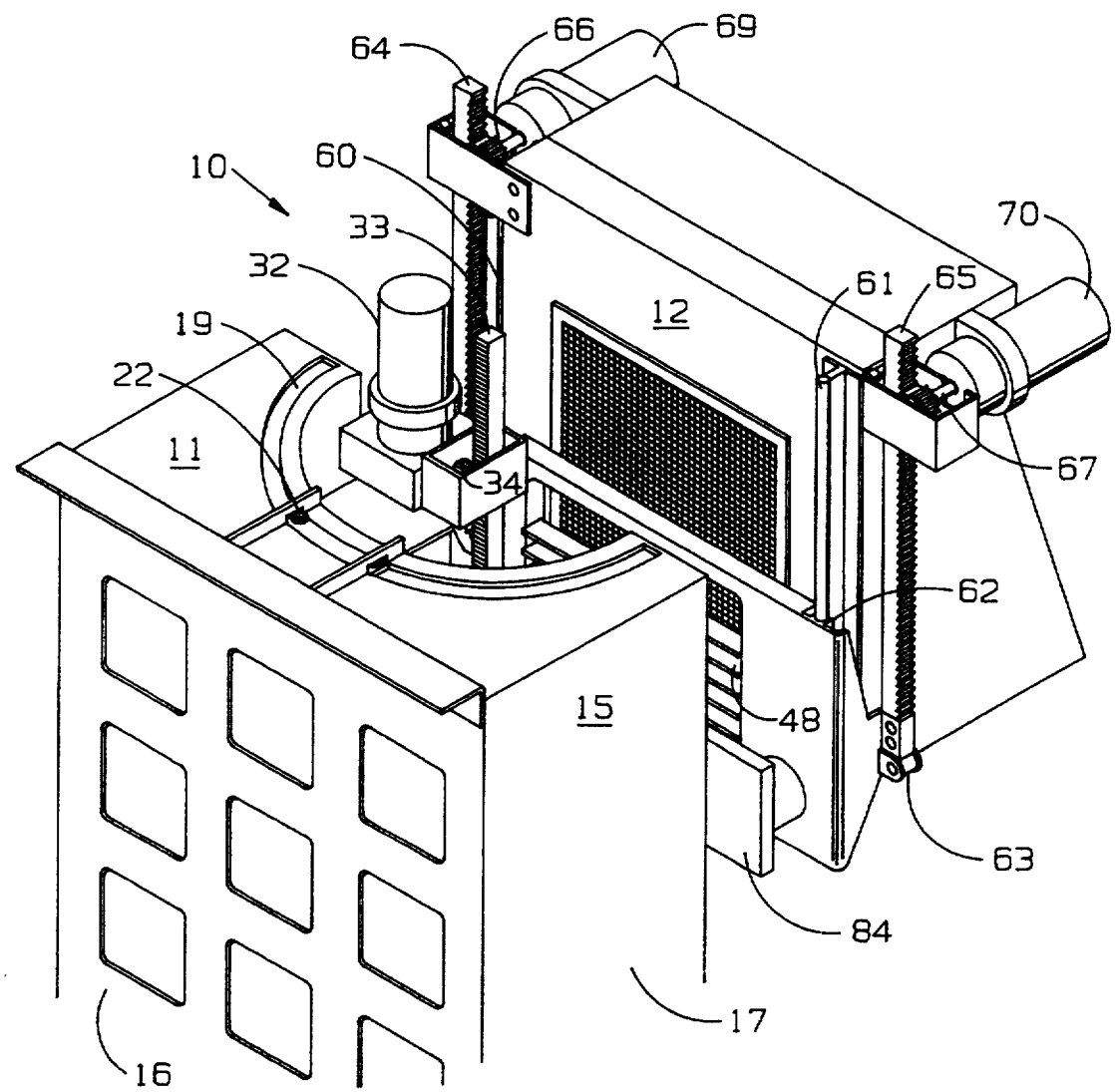
FIG. 1 is a perspective view of a preferred embodiment of the cutting apparatus of the invention.
Figure 2:
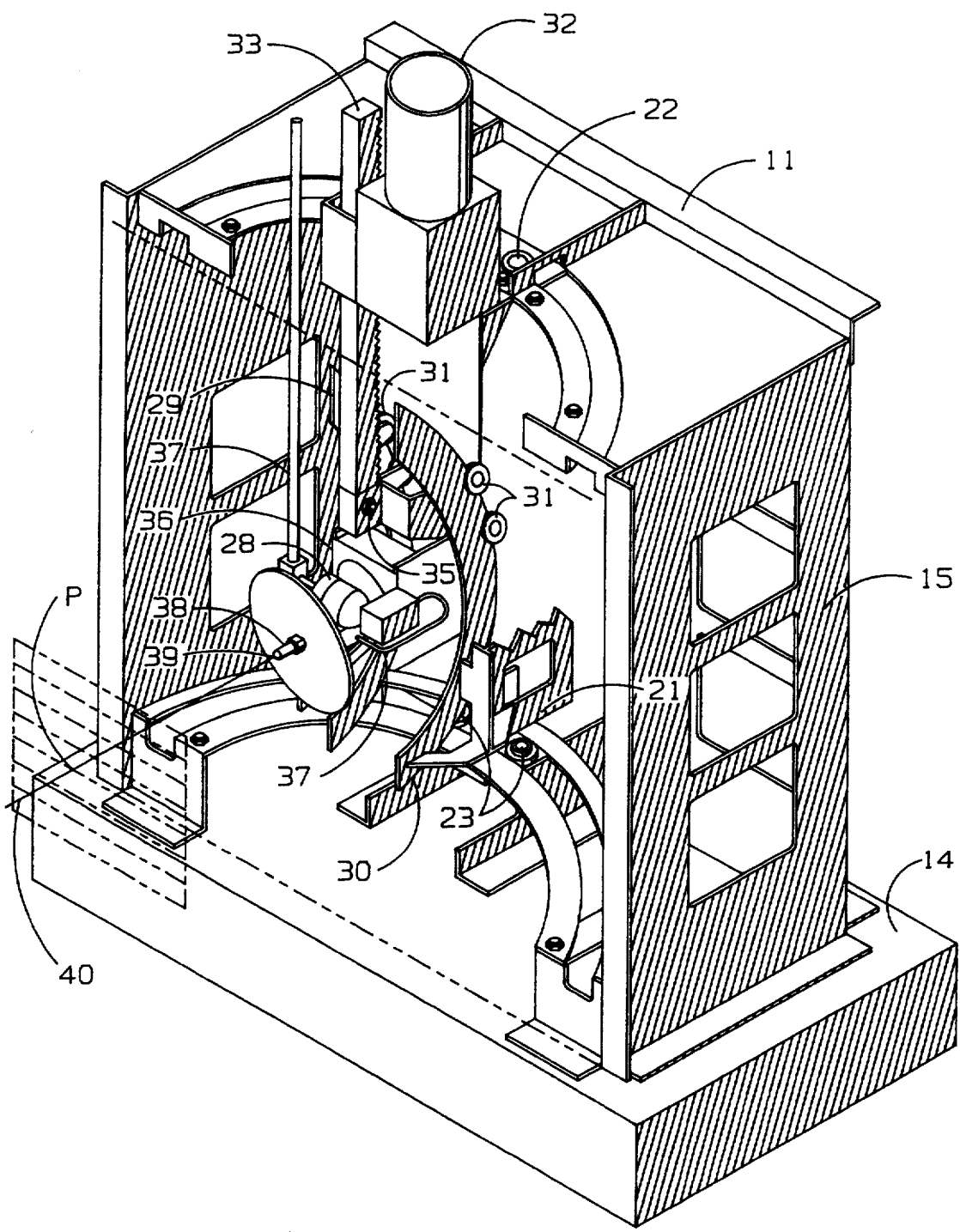
FIG. 2 is a partial perspective view of the preferred cutting apparatus of the embodiment of FIG. 1 illustrating the robot wrist with a critical cutting plane shown in phantom lines.
Figure 3:
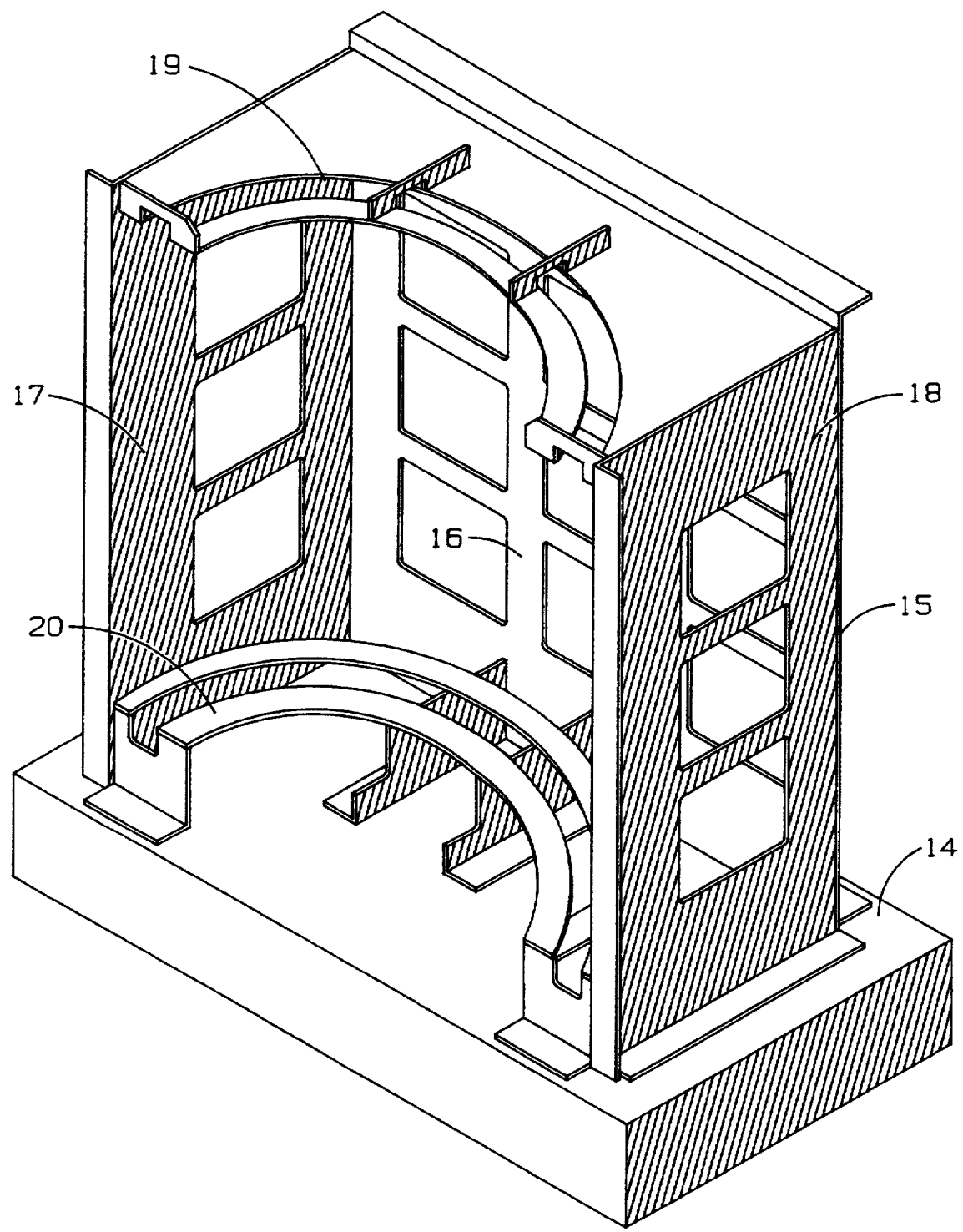
FIG. 3 is a partial perspective view of the robot wrist frame of FIG. 2.
Figure 4:
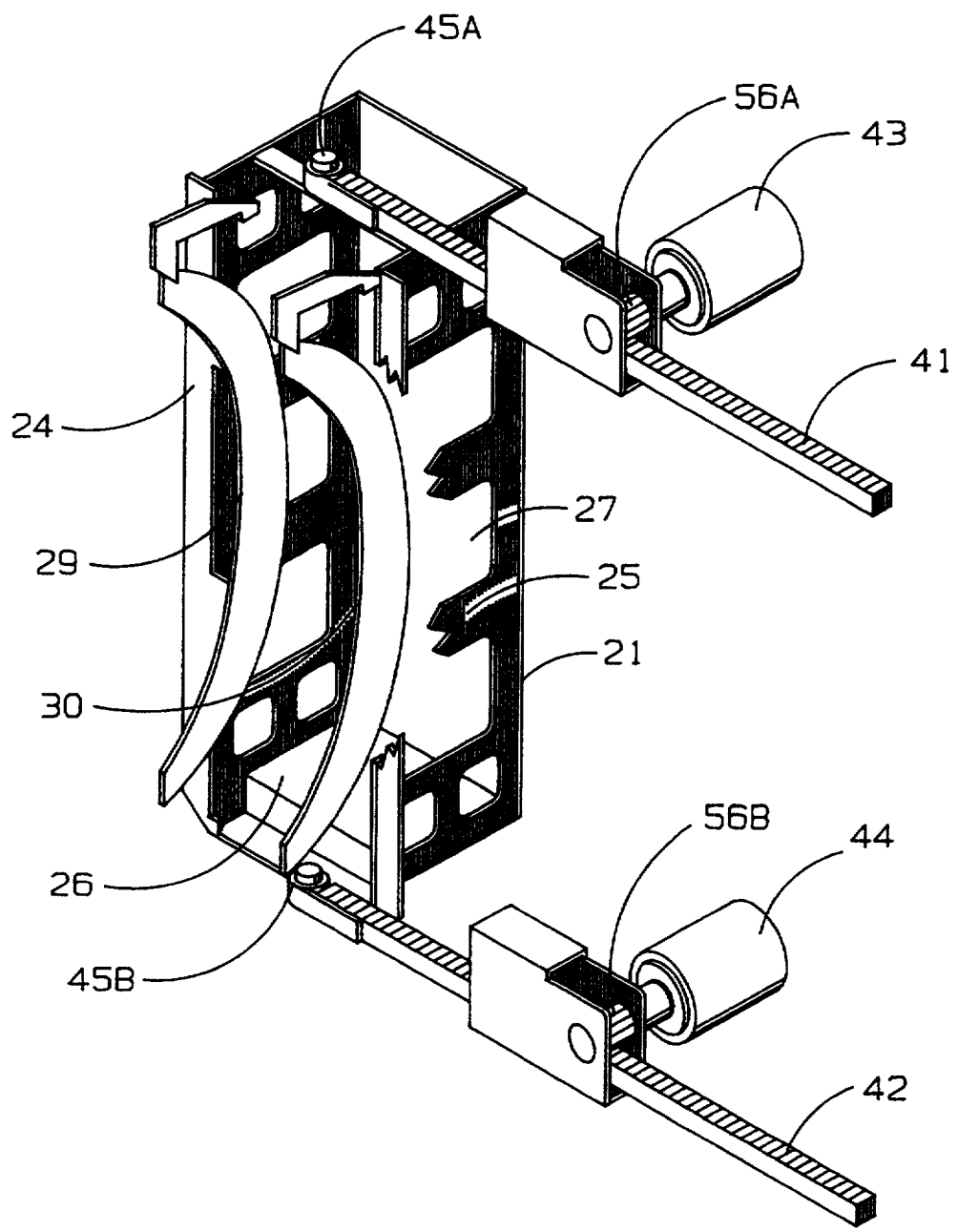
FIG. 4 is a partial cutaway perspective view of the robot wrist of FIG. 2 showing the fluid jet trolley.

FIGS. 1–7 illustrate, in different views, the preferred cutting knife apparatus 10 of the invention. A pivotable robot wrist assembly 11 includes a frame 15 having sidewalls 17, 18 and a back wall 16 on a base 14 supporting a rotatable trolley 21. The trolley 21, which includes parallel sidewalls 24, 25, a rear wall 27, and a bottom plate 26, supports a tiltable nozzle assembly 36, which includes a high-speed fluid-jet nozzle 38 fed from a high-pressure fluid reservoir (not shown) through a system of tubes 37 and a rotatable fluid coupling 28. A high-speed, narrow (approximately 0.01 cm in diameter) fluid jet, or stream, 40 is emitted by the nozzle 38 under extremely high pressure. The nozzle assembly 36 can rotate up and down about a horizontal axis along a pair of arcuate guides 29, 30. The centers of curvature of each guide 29, 30 coincide. The arcuate guides 29, 30 form part of the movable trolley 21 of the fluid jet wrist 11. Wheels 31 on the nozzle assembly 36 ride along the arcuate guides 29, 30 for smooth low-friction rotation of the nozzle assembly, which is necessary for rapid cutting. A rack gear 33 pivotably pinned to the nozzle assembly 36 by a pin 35, or the like, is engaged by a pinion gear 34 driven by a motor 32, such as a stepper motor. As the shaft of the motor 32 rotates, the rotating pinion gear 34 drives the rack gear 33 upwardly or downwardly, causing the nozzle assembly 36 to ride along the guides 29, 30, thereby adjusting the vertical component, or tilt, of the angle of entry of the fluid stream 40 into a workpiece 50.

Figure 8:
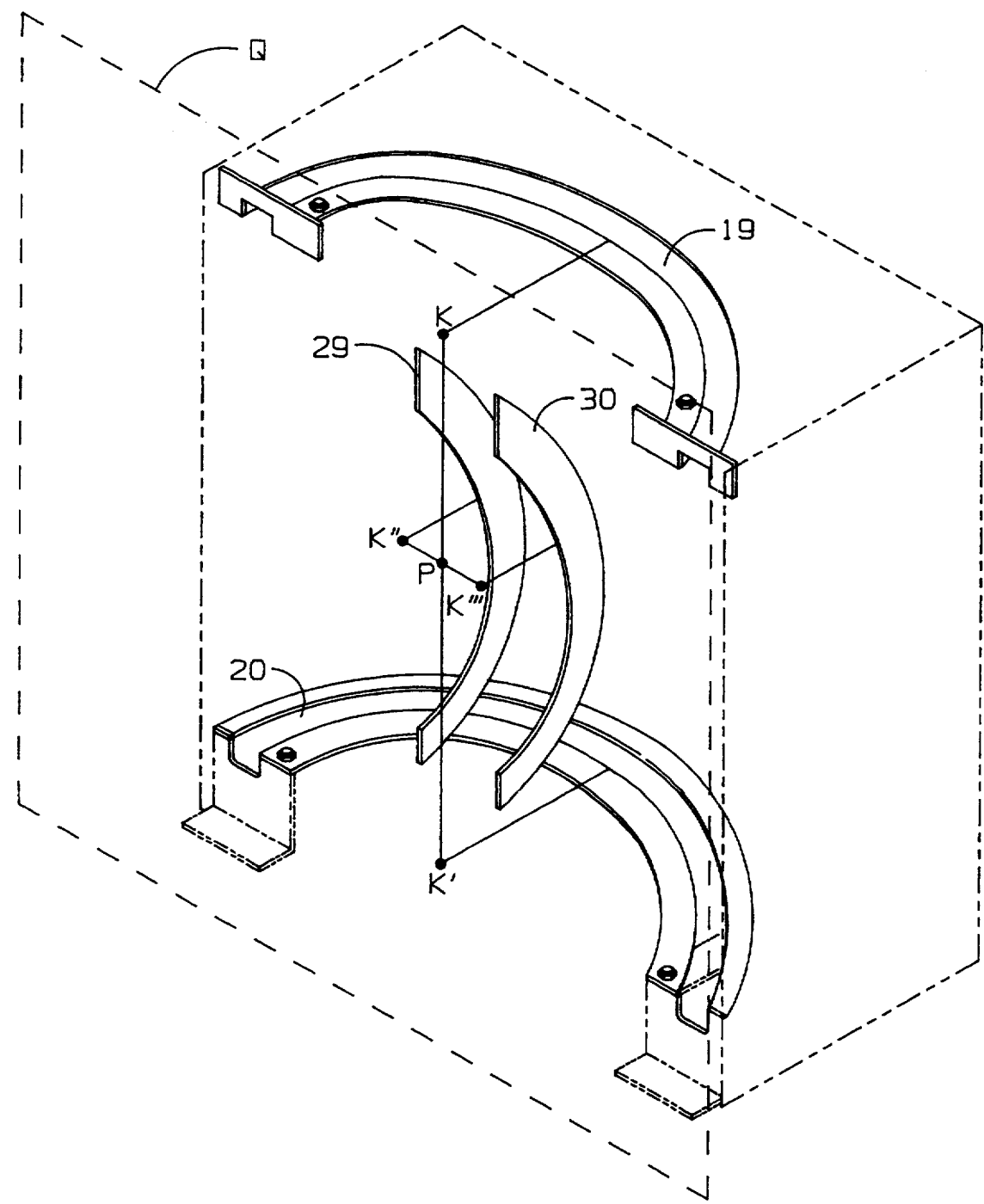
FIG. 8 is a conceptual geometric representation of the relation of the rotation guides of the preferred embodiment of the invention to each other and to a critical plane containing the entry point of the fluid jet.
Figure 19:
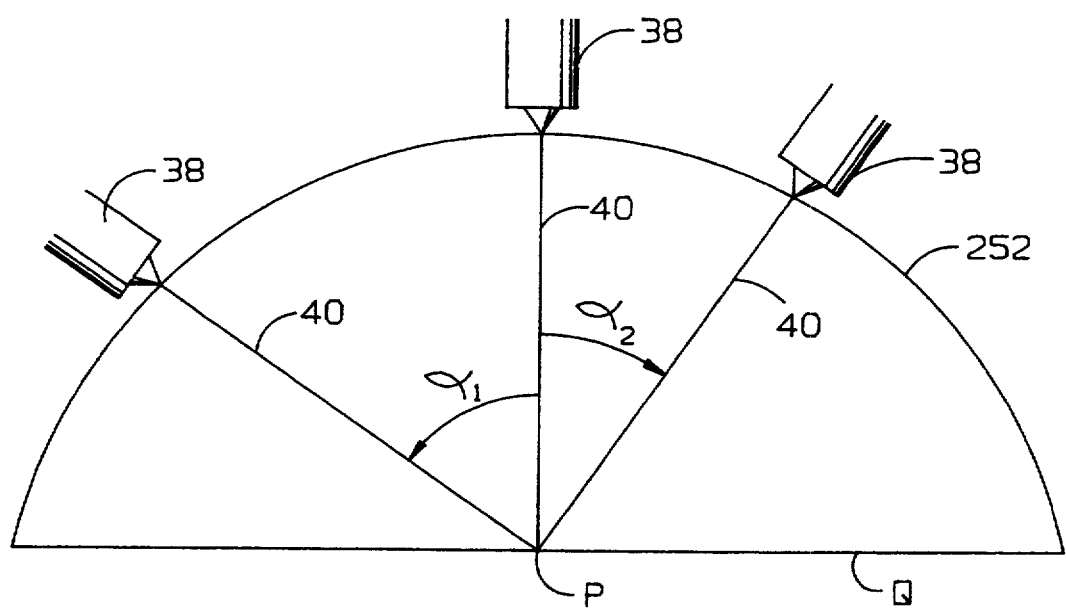
FIG. 19 is a partial side view of the fluid jet nozzle of the invention at three pivot positions relative to an entry point on the cutting plane, illustrating the pivot characteristics of the invention.

The horizontal component of the angle of entry is controlled by rotating the trolley 21, including the nozzle assembly 36, about a vertical axis by means of a pair of upper and lower arcuate guides 19, 20 formed in the fluid-jet frame 15. As shown in FIG. 8, the upper and lower guides 19, 20 each have a center of curvature (K,K') lying in a critical plane Q, along with the centers of curvature (K", K''') of the arcuate guides 29, 30. The coplanar centers of curvature on the critical plane Q ensure that the fluid jet 40 breaks the critical plane Q at a fixed point, such as the point P, regardless of the angle of rotation about either axis, as illustrated in FIG. 19 for three pivot angles 0, $\alpha_1$, $\alpha_2$. In other words, the tip of the nozzle 38 always lies on the surface of an imaginary sphere 252 at a distance r from entrance point P. The position of point P on the critical plane Q depends on the relative placement of the nozzle assembly 36 and the guides 19, 20, 29, 30.

Just as the nozzle assembly 36 rotates up and down about a horizontal axis, the nozzle assembly 36 is rotated right and left about a vertical axis smoothly by means of wheels or V-bearings 22, 23 attached to the trolley 21 that conform to and roll along the guides 19, 20. A pair of upper and lower horizontally disposed rack gears 41, 42 are pivotably pinned to the trolley 21 at pivot pins 45A, 45B and driven by engaging pinion gears 56A, 56B and motors 43, 44. In this way, the right/left motors control the horizontal component of the angle of entry of the fluid jet 40 into the critical plane Q at entry point P. Thus, point P is a pivot point about which the water jet can be pivoted horizontally and vertically by the motors without unwanted translation of the entry point P.

Figure 5:
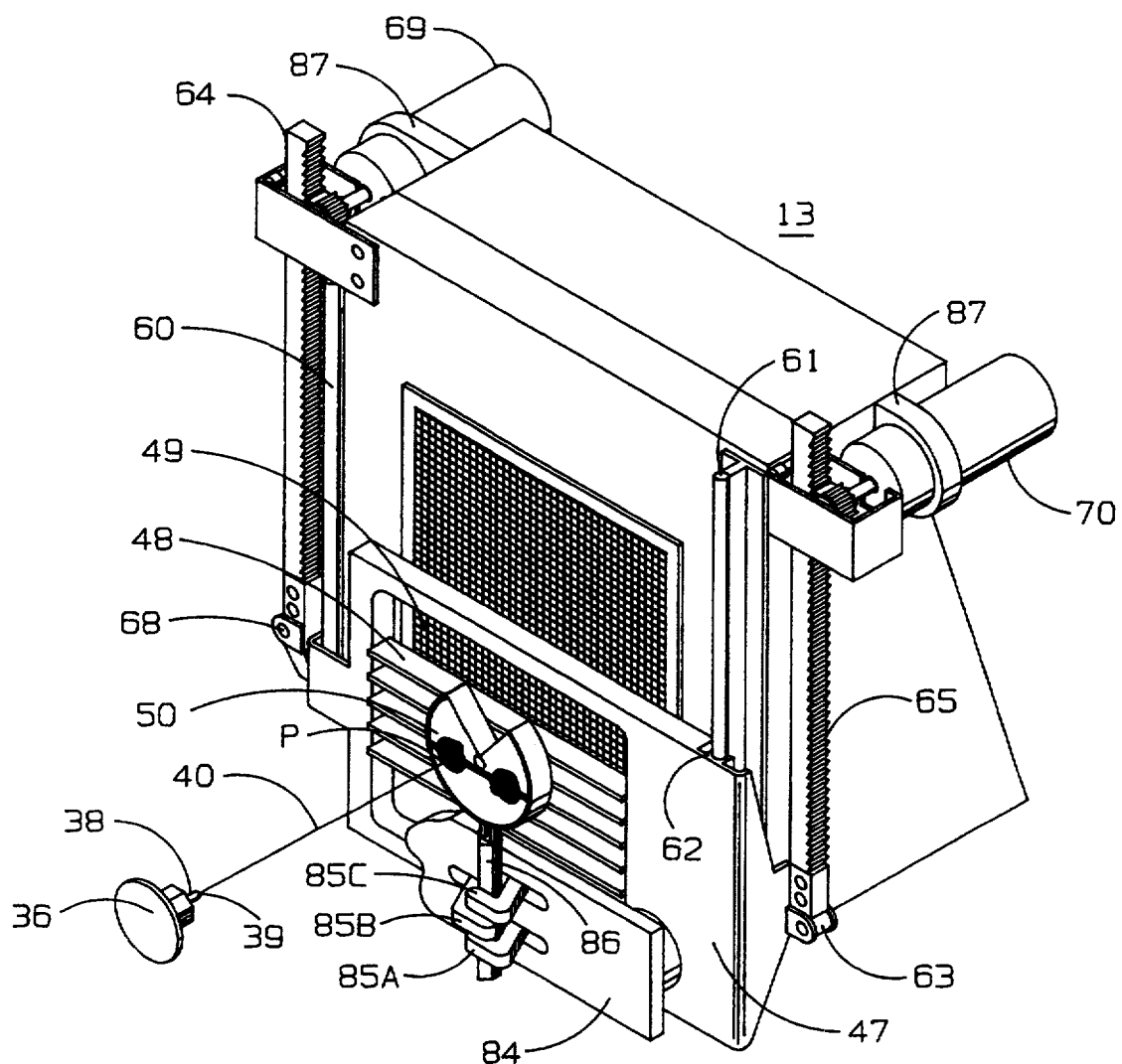
FIG. 5 is a partial perspective view of the embodiment of FIG. 1 illustrating the workpiece gantry thereof.

The workpiece 50, shown in FIG. 5 as a tuna slab, is held firmly on a holder 86, which is, in turn, retained in registration with a translatable vertical slide 47 attached to a horizontal slide 12. A gripper device 84 firmly retains the holder 86 with air-cylinder-driven fingers 85A,B,C such that a flat surface of the workpiece 50 lies in the critical plane Q and faces the fluid jet nozzle 38. The registered surfaces of the holder 86 mate with the registered surfaces of the gripper fingers 85A,B,C to maintain the correct orientation and position of the workpiece 50. The workpiece 50 is backed by rows of knife-edge slats 48 providing support for the workpiece, with only minor deflection of the fluid jet 40. Spent fluid from the jet is diffused in a screen mesh 49, dissipated in a bed of ball bearings (not shown) and drained through ductwork 57, or the like, out of the rear of the horizontal slide 12 in the direction of arrow 59 through an exhaust hose 58. The vertical and horizontal slides 47, 12, together with a base 88 make up a workpiece frame, or gantry, 13, which is positioned close to the fluid jet wrist 11 to minimize dispersion of the fluid jet 40 along its trajectory.

Figure 20A:
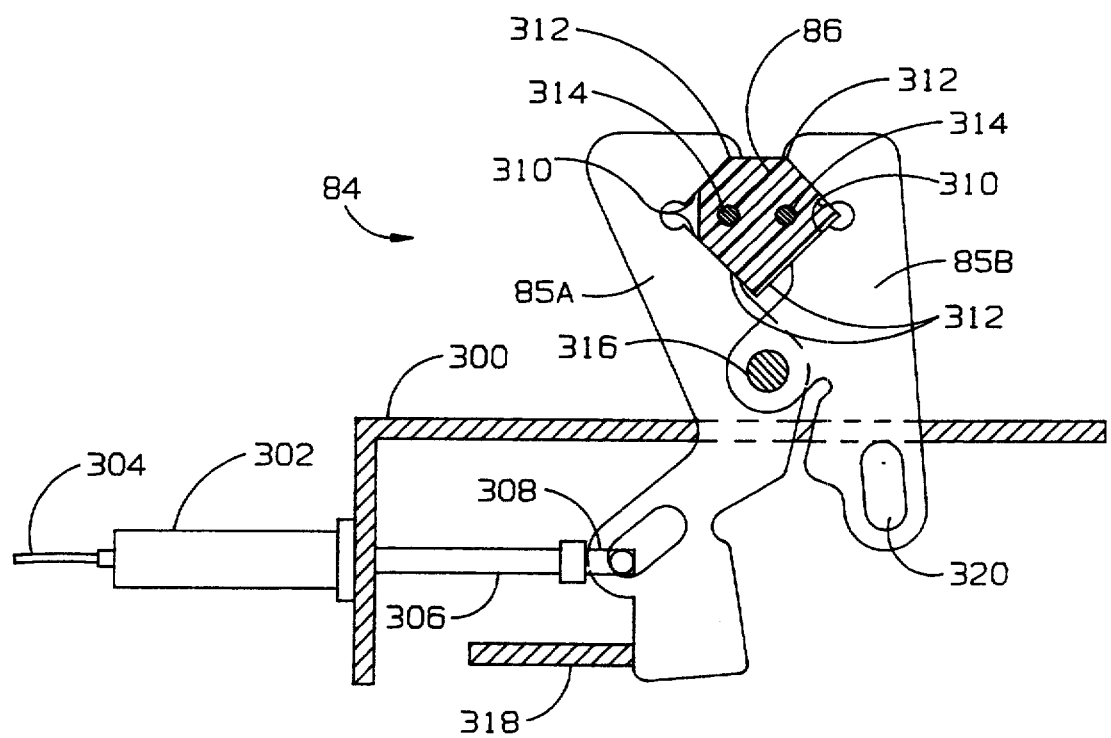
FIGS. 20A and 20B are partial sectional top views of the preferred embodiment of the gripper device of the invention in closed and open positions, respectively.
Figure 20B:
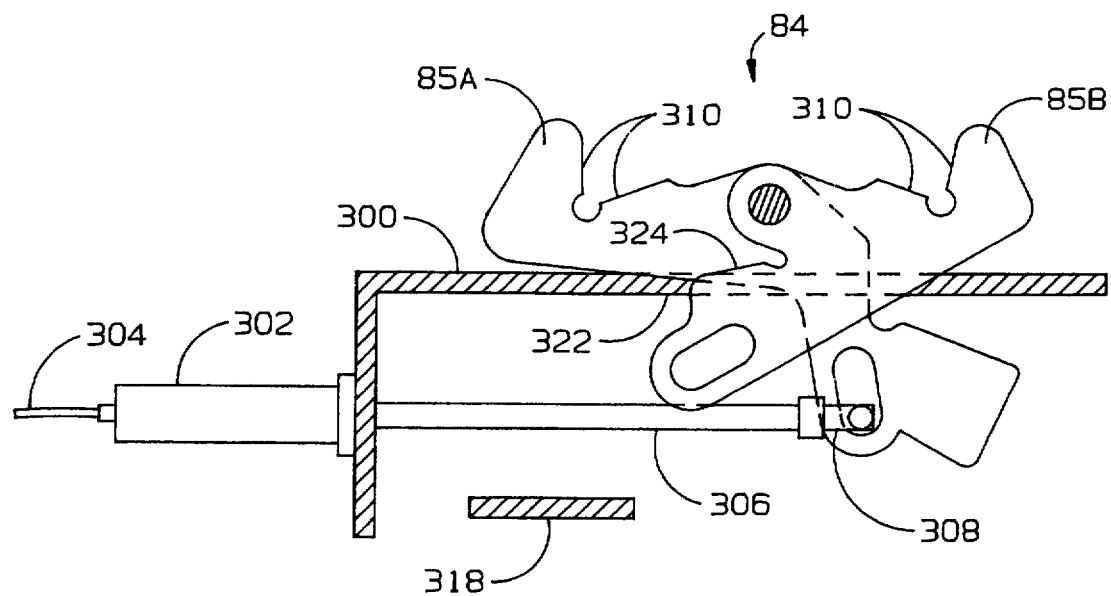

The gripper mechanism 84 is shown in more detail in FIGS. 20A and 20B. The gripper 84 includes a metal frame 300 to which one or more pneumatic cylinders 302 are attached. Each cylinder, which is controlled over an air line 304, has an extensible pushrod 306 mechanically linked to an individual finger 85A,B,C by a linkage 308. The fingers 85A,B,C are of two kinds: a short finger 85B and a long finger 85A,C. The rotation of the short finger 85B is opposite that of the long finger 85A,C during opening and closing. Flat surfaces 310 on the fingers 85A,B,C match the flat sidewalls 312 on the holder 86.

When the gripper 84 is closed, as in FIG. 20A, the pushrod 306 is retracted in cylinder 302, holding the long fingers 85A,C, which rotate about a pin 316, against a stop 318. Another cylinder and pushrod (not shown) linked to the slot 320 in the short finger 85B act to hold the short finger against sidewalls 312 of the holder 86 opposite the closed long fingers 85A,C. In this way, the slab 50 impaled on holder spikes 314 is held in a known position relative to the vertical slide 47.

The fingers 85A,B are shown open in FIG. 20B with the pushrod 306 extended from the cylinder 302, forcing a stop surface 322 of the long finger 85A against the frame 300. Simultaneously, the short finger 85B is rotated until its stop surface 324 is pressed against the frame 300. In the preferred embodiment, the gripper 84 comprises upper and lower long fingers 85A,C with an oppositely rotatable lower finger 85B mounted midway between them on a pivot pin 316. Although individual air cylinders with a simple linkage to each finger are used in this embodiment, it is also possible to achieve similar accuracy with a single air cylinder in conjunction with a more complicated linkage mechanically linking all the fingers.

While the angle of entry of the fluid jet is controlled by the two-axis arcuate pivoting means on the wrist portion of the cutting apparatus, translation of the workpiece with respect to the fluid jet 40 to produce a cutting path along the obverse surface is controlled by two-axis translation means on the workpiece gantry 13. A pair of vertical rails 60, 61 in mating bushings 62 guide the vertical slide 47 up and down. A pair of motors 69, 70 mounted to the gantry 13 by brackets 87 each drive a pinion 66, 67 along a rack gear 64, 65. Each rack gear 64, 65 is attached to the vertical slide 47 by a pivot pin 63, 68. Thus, the vertical slide 47 and, thereby, the gripper 84, the holder 86, and the workpiece 50 can be translated up and down with respect to the fluid jet 40.

As shown in FIG. 7, horizontal translation is achieved by translating the horizontal slide 12 along a pair of horizontal guide rails 71, 72 upon which the horizontal slide 12 rides on slide bearings 73, 74, 75, 76. The guide rails 71, 72 are affixed to gantry base 88, which includes a ball screw drive mechanism, including a motor 77, a drive screw 78, bearing races 83, and a ball 79 attached to the bottom of the horizontal slide 12. (Rack and pinion gears can be used interchangeably with ball screw mechanisms to achieve translation of the slides or rotation of the trolley and nozzle assembly.) In this way the workpiece 50 can be translated horizontally with respect to the fluid jet 40. By translating the workpiece, instead of the fluid jet knife, smaller motors can be used with small workpieces, because the workpiece horizontal and vertical slide assemblies 12 and 47 are lighter than the fluid jet carriage assembly.

Figure 9:
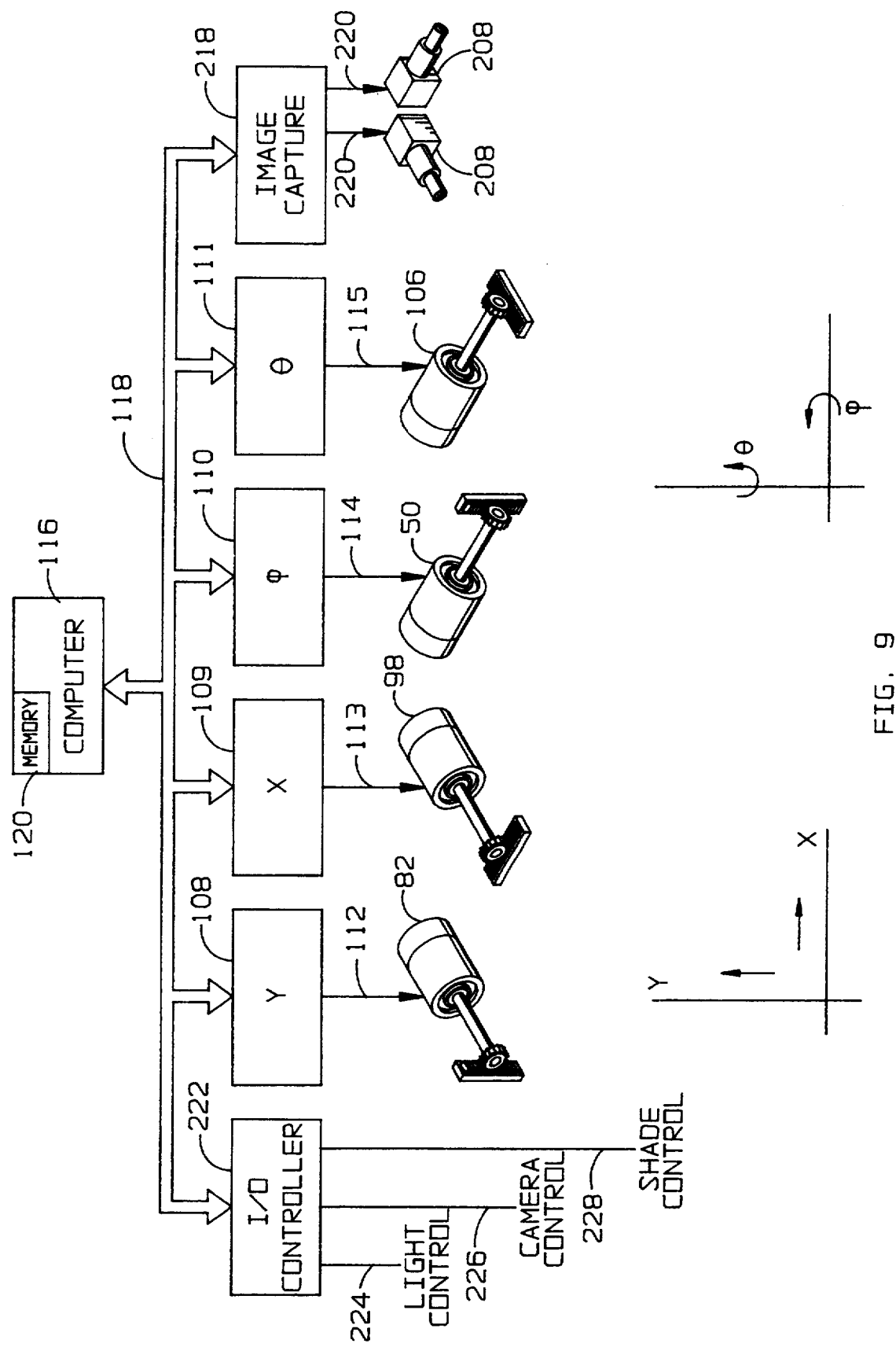
FIG. 9 is a block diagram of the motion controller of the invention.

The motors 69, 70, 77 for translating the workpiece and the motors 32, 43, 44 for pivoting the fluid jet are controlled by individual motion controllers 108–111, as shown in FIG. 9. Each motion controller 108–111 controls the activation of its associated motor or motors and, thereby, the motion of the nozzle 38 about or the workpiece 50 along an associated axis. Preferably, the axes are orthogonal to simplify the control by decoupling the respective motions. The workpiece is translated up and down along a Y-axis through activation of the vertical translation motors 69, 70 according to Y-axis control signals from the Y-axis motion controller 108 over a signal line 112. Similarly, horizontal translation is controlled via the horizontal translation motor 77 according to X-axis signals from the X-axis motion controller 109 over a signal line 113. Pivoting of the nozzle 38 about a horizontal axis is controlled via the up/down rotation motor 32 according to $\phi$-axis signals from the $\phi$-axis motion controller 110 over a signal line 114. The horizontal rotation component of nozzle pivot about a vertical axis is controlled via the left/right rotation motors 43, 44 according to $\theta$-axis signals from the $\theta$-axis motion controller 111 over a signal line 115. These independent motion controllers 108–111 are controlled, in turn, by a computer 116, such as an IBM PC, over a computer bus 118, or dedicated communication links.

Although a number of commercial motion controllers are suitable, the cutting apparatus of the invention uses the Model Mover-PC motion controller manufactured by Extratech, Inc. of Post Falls, Id. The Extratech motion controller combines all four controllers on a single circuit board. The motion controllers 108–111 for each axis output signals comprising a number of pulses to the stepper motors 32, 43, 44, 69, 70, 77 through motor drivers 260–263, which convert the low-power output signals into higher-power control signals to drive the motors. The number of pulses is proportional to the selected amount of translation along or rotation about the associated axis. The motion controllers may also be operated such that the rate of motion for a particular step for each axis can be coordinated with motion for the others. For example, if five pulses are required to produce a desired vertical translation along the Y-axis associated with a horizontal translation along the X-axis requiring ten pulses, the Y-axis motion controller 108 outputs the five pulses to the Y-axis motors 69, 70 at half the rate of the ten pulses output by the X-axis controller 109 to the X-axis motor 77. In this way, the translations along each axis are timed to move the workpiece along the shortest path. This coordination of translation can similarly be extended to include coordination of translation with rotation of the nozzle 38. The overall coordination results in a smoother, more accurate cut.

Figure 10:
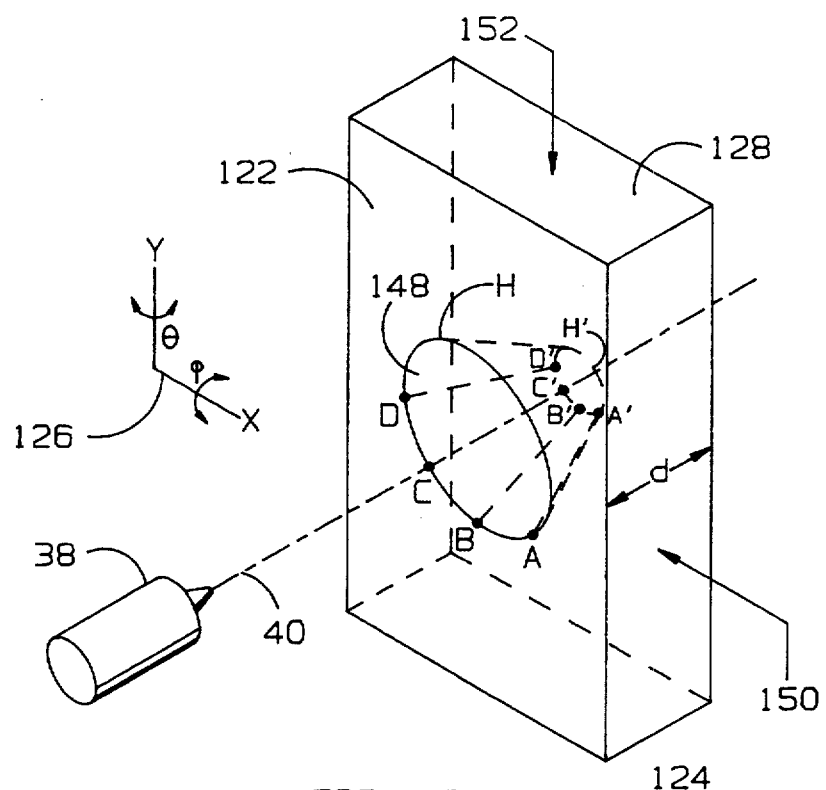
FIG. 10 a perspective view of a workpiece being cut in accordance with the invention along a predetermined path.

The characteristics of the cut are ultimately controlled by a program executed by the computer 116. Digital values representing the coordinate pairs of points defining the cutting path, or consecutive entry points A', B', C', D' of the fluid jet 40, on the obverse surface 122 of the workpiece 124, as shown in FIG. 10, in the x-y reference frame 126 are stored in the computer's memory 120. Likewise, a similar set of digital values representing consecutive exit points A', B', C', D' on the reverse surface 128 of the workpiece 124 are also stored in the memory 120. Each exit point A'–D' is associated with a corresponding entry point A–D. For each entry/exit pair, e.g., D—D', vertical and horizontal entry angles $\phi$ and $\theta$ can be computed such that the water jet 40 entering the workpiece 124 at D exits at D'. If the coordinate values of D and D' are given by $(x_D, y_D)$ and $(x_{D'}, y_{D'})$ and the thickness of the workpiece 124 is given by d, the horizontal entry angle $\theta$ at D is computed as $\theta = \tan^{-1}[(x_D - x_{D'})/d]$ and the vertical entry angle $\phi$ at D is computed as $\phi = \tan^{-1}[(y_D - y_{D'})/d]$. This computation of the components $(\theta, \phi)$ of the entry angle could be computed off-line and stored in place of the exit path coordinates in the memory 120 or could be computed from the entry and exit values on-line during the cutting process.

Figure 13:
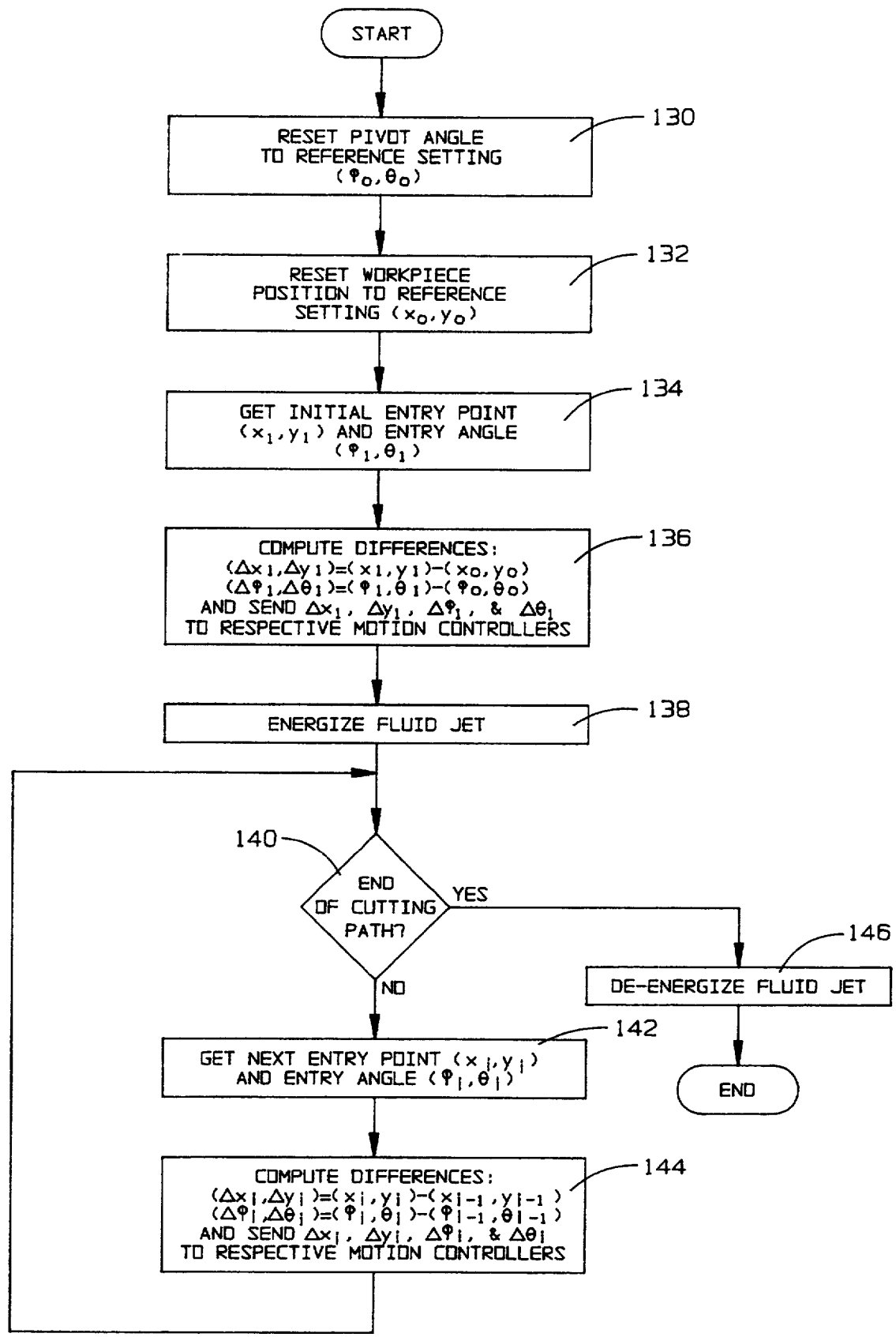
FIG. 13 is a flowchart representing the method of cutting a workpiece along a predetermined path in accordance with the invention.

The cutting process is controlled according to the flowchart of FIG. 13. Reference to FIGS. 10–12 should assist in understanding the invention. After the workpiece 124 is positioned with its obverse surface 122 toward the nozzle 38, the cutting routine flowcharted in FIG. 13 is executed by the computer 116. First, the nozzle 38 is pivoted to a known reference position ($\phi_o$, $\theta_o$) as in step 130. Such a position could, for example, be defined by pivoting the nozzle 38 against lower and right pivot limits, which are known. From such a reference angle, subsequent pivot angles can be determined by dead reckoning. Similarly, as in step 132, the workpiece 122 is translated to a reference position ($x_o$, $y_o$), such as lower and right limits of x-y excursion. The coordinates of the first entry point ($x_A$, $y_A$), such as point A in FIG. 10, and its associated entry angle ($\phi_A$, $\theta_A$) are retrieved from memory 120, as in step 134. Then, as in step 136, the differences between the reference position and the first entry point ($\Delta x_1$, $\Delta y_1$) and the reference pivot angle and the first entry angle ($\Delta \phi_1$, $\Delta \theta_1$) are computed and sent over the bus 118 to the respective motion controllers 108–111. The motion controllers 108–111 then convert the four difference values $\Delta x_1$, $\Delta y_1$, $\Delta \phi_1$, and $\Delta \theta_1$ into corresponding numbers of pulses to be sent to the X-axis, Y-axis, $\phi$-axis, and $\theta$-axis motors to accordingly line up the nozzle 38 with respect to the workpiece 122 for the start of the cut. The high-speed fluid jet 40 is then turned on to start the cut, as in step 138. Subsequent entry point values and entry angle values along the path are consecutively retrieved from memory and the differences between consecutive values are computed and sent to the motion controllers. This process is repeated, as in steps 140, 142, and 144, until the end point of the path is reached. At the end point, the water jet 40 is turned off as in step 146. The process can be repeated for other cutting paths on the workpiece. Re-referencing as indicated by steps 130 and 132 is not necessary with the same workpiece, so that the process of cutting a second path along the workpiece can restart at step 134, using the final settings at the end of the previous cut as the reference values ($x_o$, $y_o$) and ($\phi_o$, $\theta_o$).

FIG. 10 illustrates an example cutting path through a solid rectangular workpiece 124. For the example, the desired result is to cut a frustum-shaped section 148 from the workpiece 124. Entrance path H on the obverse side 122 is circular with a radius greater than that of a circular cutting path H' on the reverse side 128. Four points A–D, which span one-fourth of the path H, are shown along with four associated points A'–D' on the exit path H'. In practice, many more points than are shown between A and D would be involved in each step of the cutting process, but are left out of the figure for clarity.

Figure 11A:
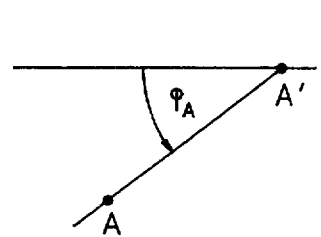
FIGS. 11A and 11B are geometric representations of the two orthogonal components of the pivot angle of the fluid jet nozzle as seen from sides 150 and 152 for cutting points A through D on the workpiece of FIG. 10.
Figure 11A:
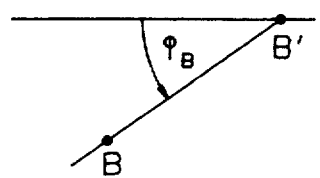
Figure 11A:
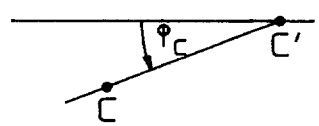
Figure 11A:
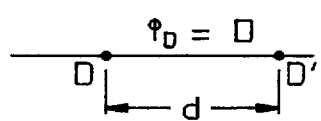
Figure 11B:
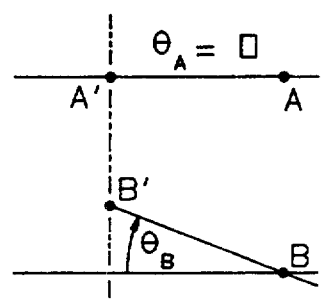
Figure 11B:
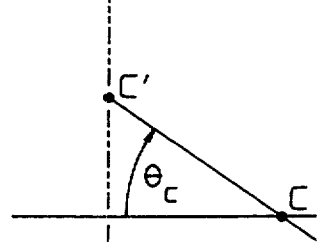
Figure 11B:
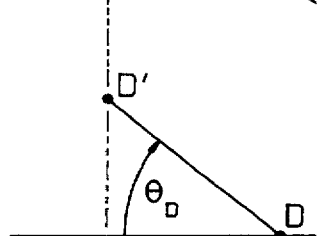
Figure 11B:
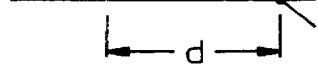
Figure 12A:
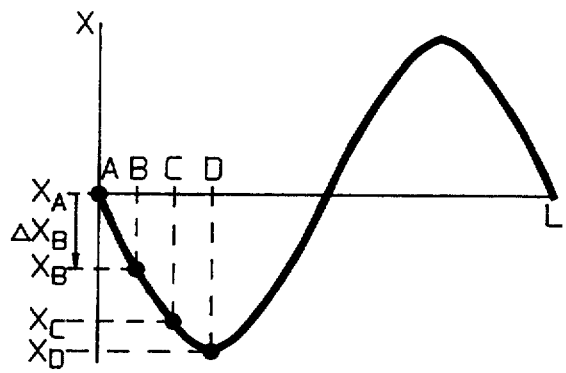
FIG. 12 plots the continuous analog of the discrete digital signals sent to the four motion controllers from the computer of the invention as a function of distance along the cutting path of FIG. 10.
Figure 12B:
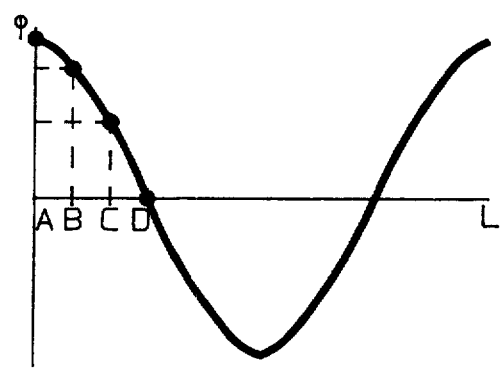
Figure 12C:
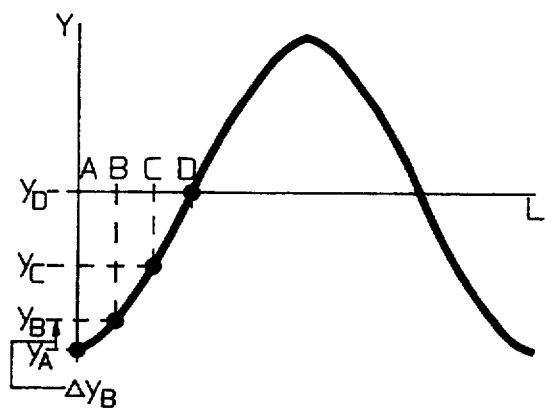
Figure 12D:
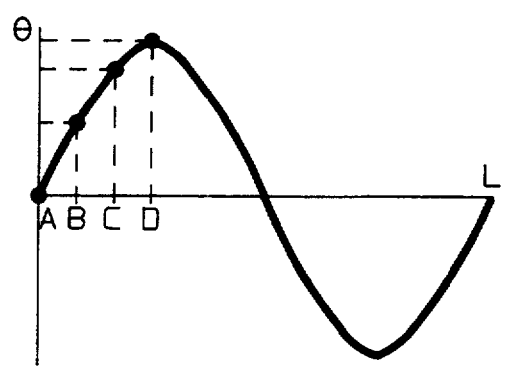

To produce the beveled cut shown in FIG. 10, entry points and entry angles following sinusoidal characteristics with respect to arc length L along the cut are stored in the computer's memory 120. As FIG. 12 shows, the abscissa at each point A–D represents the value stored in memory to represent the cutting path in an x-y coordinate system in the plane of the obverse side 122. The cutting path H' on the reverse side 128 is in an x'-y' coordinate system parallel to the x-y coordinate system. The changes in entry angle components $\phi$ and $\theta$ at points A–D along the cut H are illustrated in FIGS. 11A and 11B. FIG. 11A shows the projection of the angle $\phi$ on side 150 of the workpiece 122; FIG. 11B shows the projection of the angle $\theta$ on side 152. Thus, the workpiece 122 is translated continuously to adjust the entrance point along the cutting path, while the nozzle 38 is simultaneously pivoted to the corresponding entry angle to produce the exit path H'.

As previously described, the memory 120 of the computer 116 contains values representing the cutting paths. Although in the preferred embodiment these values comprise coordinate pairs representing points along the entrance cutting path in the surface of the workpiece facing the knife and the coordinate pairs representing the exit cutting path on the reverse surface of the workpiece, the memory could alternatively include alternative values derivable from the entrance and exit point coordinate values. For example, values representing the components of the entry angle could be stored in memory. Furthermore, instead of storing the absolute entry points, entry angles, or exit points, the memory could, instead, contain the difference values of these quantities from point to point to define the cutting path.

Although the workpiece shown in FIG. 10 includes a regularly shaped workpiece and a fairly simple cutting path, other irregularly shaped workpieces requiring complex cutting paths can also be cut with the apparatus of the invention. For example, the fluid jet cutting system can be used to cut skin and blood meat away from light, edible tuna loins. Another application is in the trimming of fat from beef steaks. To cut such irregularly shaped articles on a production line without unnecessary waste, it is necessary to determine individual cutting paths for each article. Scanning or imaging one or more surfaces of the workpiece can be used to produce an image or map of selected surface attributes from which a cutting path can be derived. Ranging devices, using laser or ultrasonic techniques to map surface contours, or visioning devices, such as video cameras to map surface reflectance, can alternatively be used to image the cutting surface of the workpiece.

Figure 14:
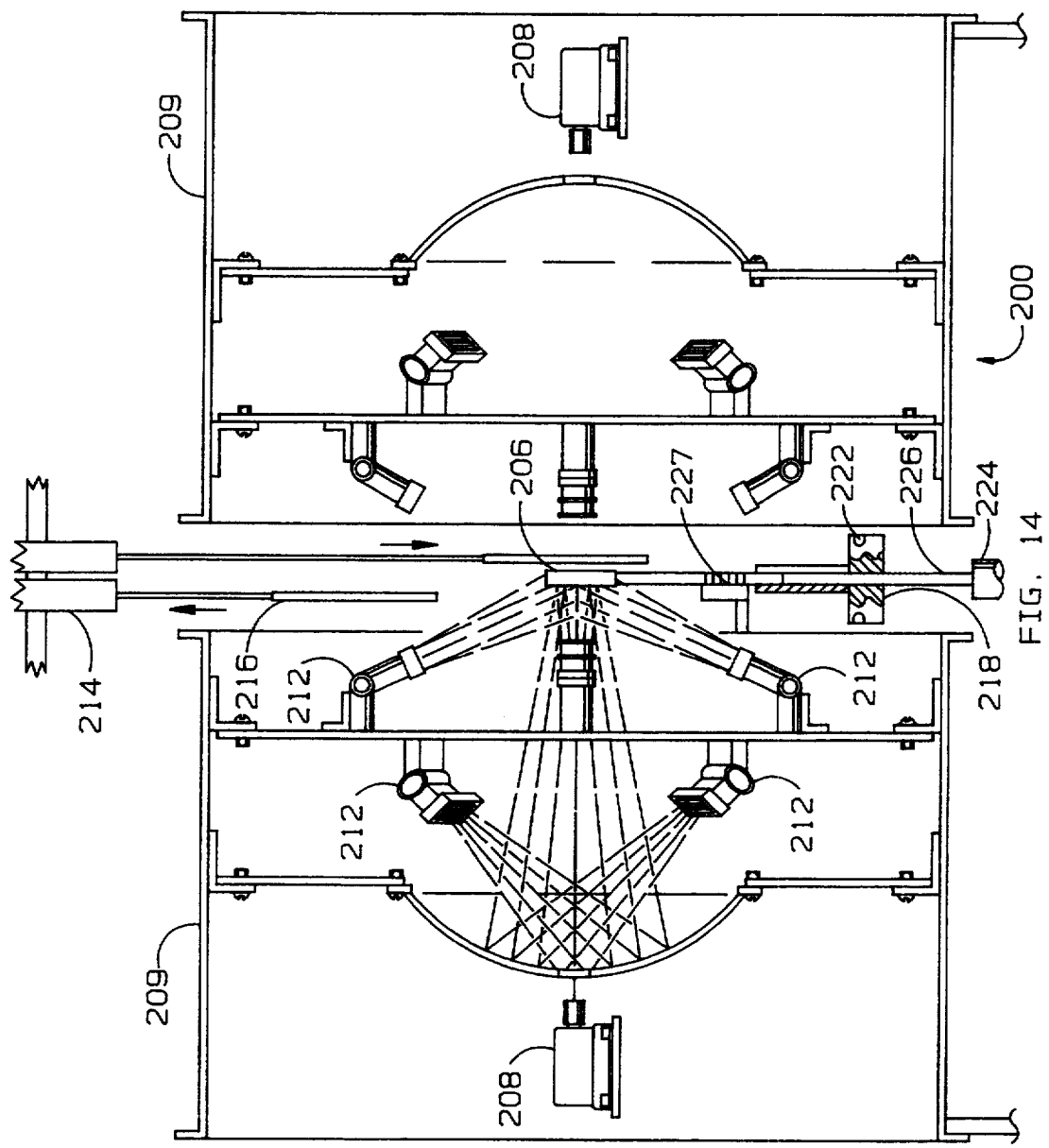
FIG. 14 is a side view of a preferred embodiment of the visioning apparatus of the invention.
Figure 15:
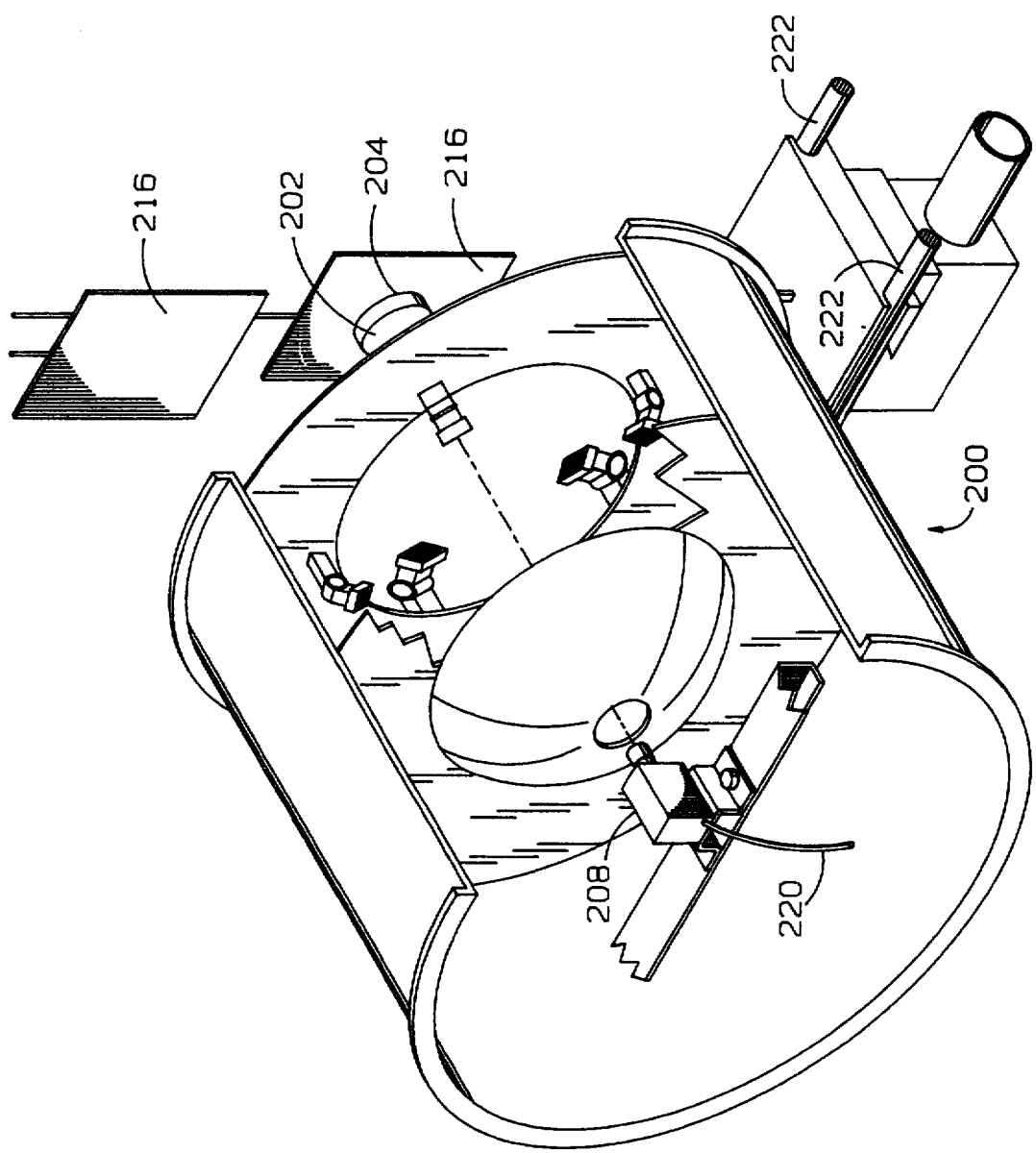
FIG. 15 is a partial perspective view of one side of the visioning apparatus of FIG. 14, also showing the conveyor system of the invention.

The visioning station 200 shown in FIGS. 14 and 15 is used in the preferred embodiment of the invention to produce a two-dimensional map of front 202 and rear 204 surfaces of a workpiece 206, such as a tuna slab. Cameras 208, such as video cameras, are provided at ends of identical facing superstructures 209, each camera 208 being positioned to view a respective surface of an intermediately disposed workpiece 206 along a line of sight 210. A carrier 218 and a workpiece holder 220 are conveyed into horizontal position along a pair of conveying rails 222. An air cylinder 224 forces a push rod 226 into an aperture in the carrier 218 to push the holder 220 and the workpiece 206 into vertical registration along the lines of sight 210, where it is grabbed and firmly held in place by a gripper 227 similar to the gripper device 84 in FIG. 5. The registered grip fingers of the gripper 227 engage the holder 220 to keep the generally planar surfaces 202, 204 of the workpiece 206 normal to the lines of sight 210. High intensity, short-duration light sources 212 illuminate one surface of the workpiece 206 for the camera 208. Air pistons 214 synchronized with the strobing of the light sources 212 alternately drive one of the suspended screens 216 into or out of a position adjacent one or the other surface of the workpiece to provide a dark background for the camera 208 viewing the far surface of the workpiece 206. Each camera 208, in turn, scans a respective surface of the workpiece 206, producing a video image signal converted into a pixel (picture element) map, or two-dimensional array of brightness (darkness) values proportional to the reflectance of each point on the surfaces of the workpiece 206. The video image signals are sent on video cables 220 from the cameras 208 to a video imaging circuit 218 (FIG. 9), which produces the map. The computer 116 can read the map over the bus 118, as shown in FIG. 9. Image capture boards 218 are available commercially, such as the Matfox Image LC, manufactured by Matrox Electronic Systems, Ltd. of Dorval, Quebec, Canada. Synchronized control of the timing of the light sources 212, the suspended background screens 216, and the cameras 208 is achieved via a bus-connected I/O controller 222 over control lines 224, 226, 228.

Figure 16A:
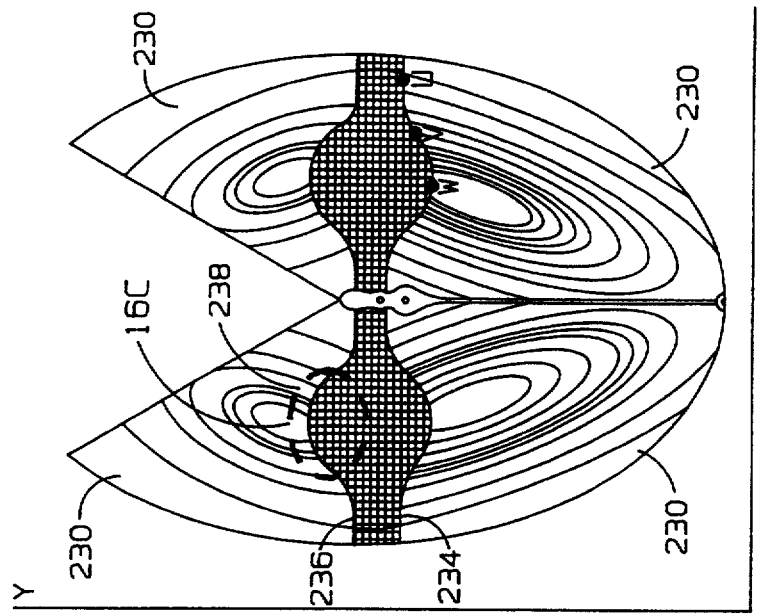
FIGS. 16A and 16B represent side images of a tuna slab as taken by the visioning apparatus of FIGS. 14–15 shown superimposed on coordinate axes, including in FIG. 16C a magnified portion of a region on one surface of the tuna slab depicting reflectance values of pixels covering that region.
Figure 16B:
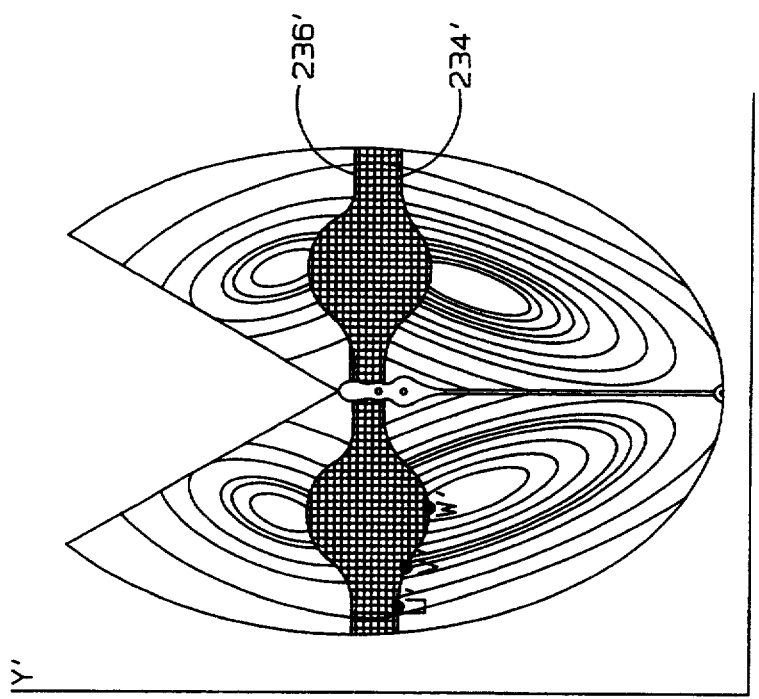
Figure 16C:
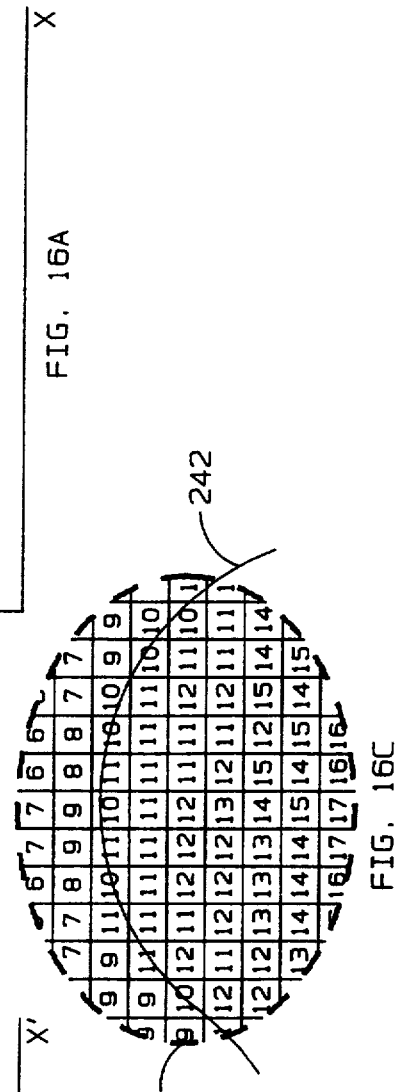

From the two-dimensional arrays of surface attributes, in this case reflectance values, a path determination program executed by the computer 116 can determine a cutting path for each surface of the workpiece. FIGS. 16A and 16B represent video images of the obverse and reverse surfaces of an eviscerated tuna slab. On the entrance surface of FIG. 16A, four edible loin portions 230 are separated from a blood meat portion 232 along two boundaries 234, 236. Associated portions and boundaries on the reverse surface are shown in FIG. 16B by identical reference numbers, but primed. The magnified view in FIG. 16A shows diagrammatically a typical array 240 of reflectance values in a small region 238, of the image. By convention, the greater values represent darker regions.

The computer 116, executing a path determination program, stores in its memory 120 the x'-y' coordinate values of points on the obverse surface satisfying preselected criteria. The process is repeated with the x'-y' coordinate values on the reverse surface. These sets of points represent a desired cutting path. For example, if one wants to cut along the boundaries 234, 236, the cutting criterion could be to select a contiguous set of reflectance values above a certain darkness threshold that are also contiguous with values below the darkness threshold. (A similar result can be achieved alternatively by selecting a contiguous set of maximum reflectance gradient values to define a boundary.) For the values in the array 240 shown in FIG. 16A, a darkness threshold having a reflectance value of ten would produce a boundary path 242, representing the magnified portion of the boundary 236. Using an appropriate peak-searching algorithm, the computer 116 can define such a cutting path along the boundaries 234, 236.

From the x-y coordinates of the pixels lying on the selected cutting path, the computer 116 can define a more continuous path by fitting a smooth curve to the pixel coordinates. Excellent accuracy is achievable by connecting the set of pixels on the selected cutting path with a sequence of curve segments or splines represented by cubic equations of the form: $y = a_3 x^3 + a_2 x^2 + a_1 x + a_0$. By requiring that the endpoints of each cubic spline be common with the endpoints of adjacent splines and that the first derivative and perhaps higher derivatives of each at the endpoints be likewise equal, a smooth path connecting the pixels can be defined using standard curve-fitting techniques. From the derived sequence of cubic splines, points on the cutting path intermediate the pixels can be derived to produce a much finer cut.

Figure 17:
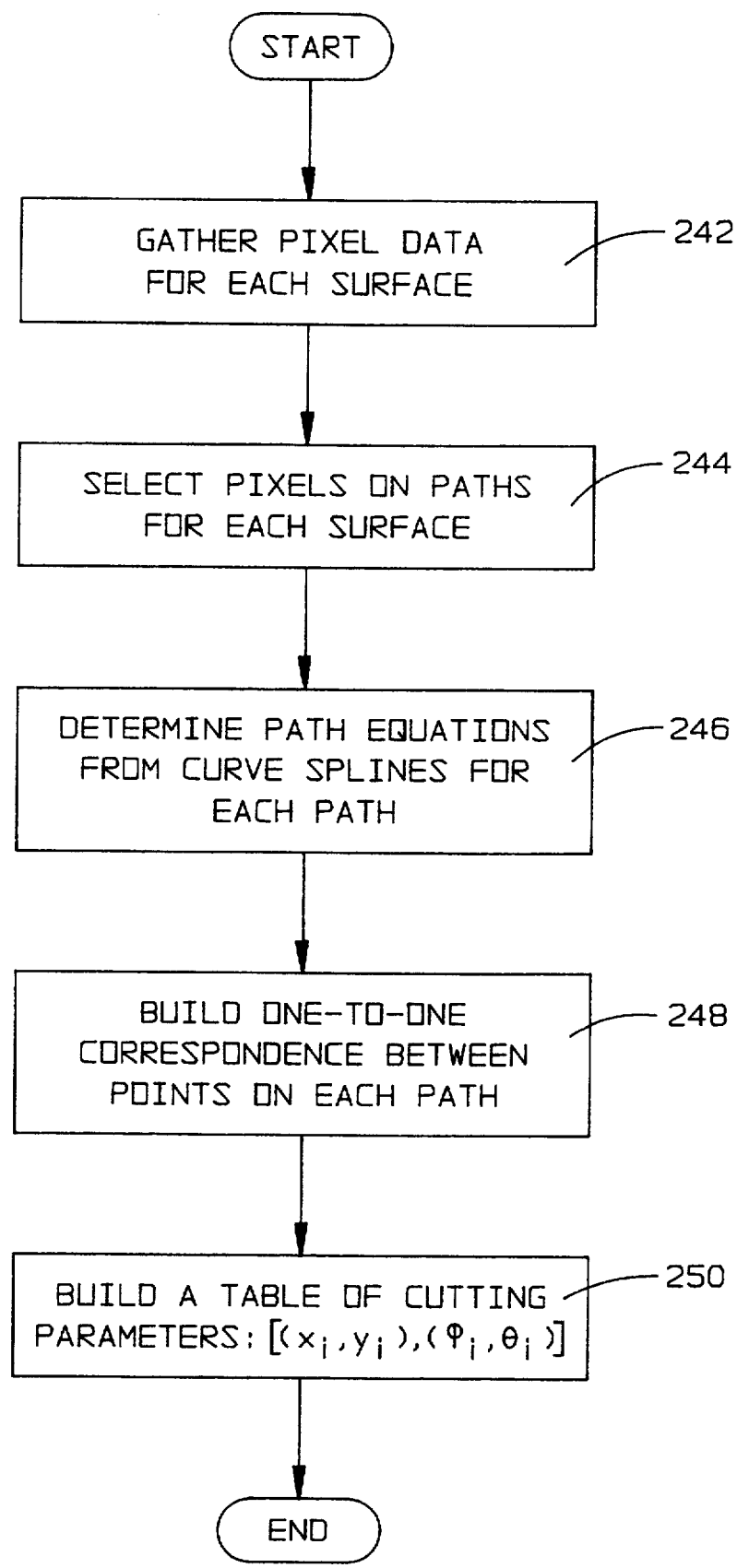
FIG. 17 is a flowchart of the method of imaging and deriving cutting paths in accordance with the invention.

A flowchart of the program executed by the computer in determining the values representing the cutting paths is shown in FIG. 17. After the map of each surface has been generated, as shown in step 242 and as already described, search criteria are defined and a path-searching algorithm selects those pixels on each surface meeting the search criteria, as in step 244. From the set of coordinate values representing the selected pixels defining each cutting path, a sequence of equations of continuous curve segments representing the selected path along each surface is derived, as in step 246. Once the two path equations are defined, each is coordinated with the other to define corresponding points on each. In other words, for each fluid jet entrance point on the obverse surface, a corresponding exit point is defined. In many cases, one path is longer than the other.

Figure 18:
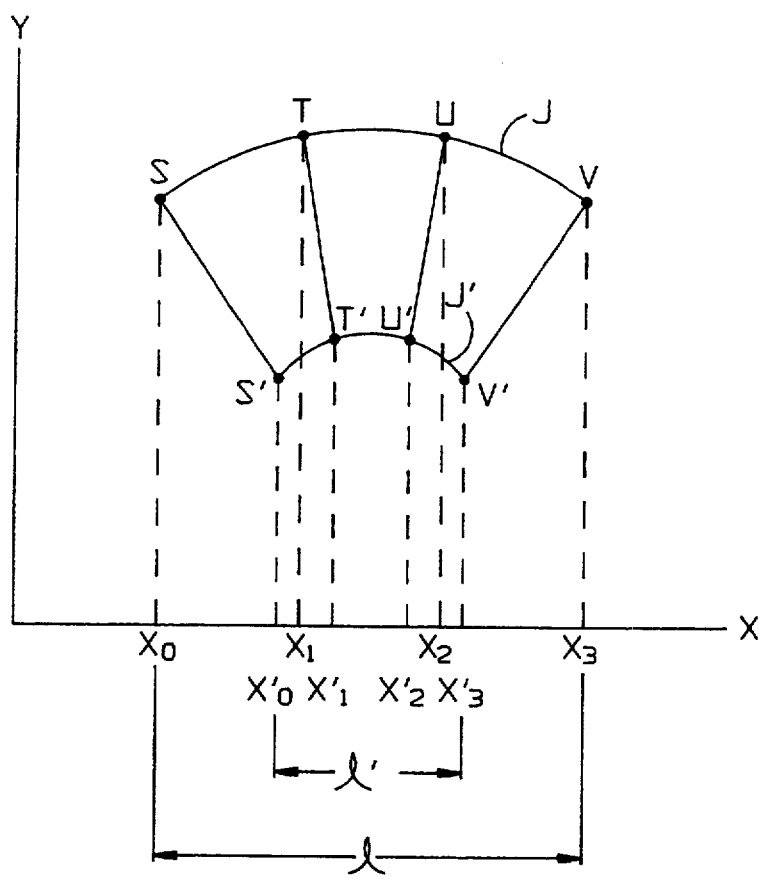
FIG. 18 is a geometric representation of the step in FIG. 17 of deriving a one-to-one correspondence between points on the entry and exit paths of the workpiece, especially one having irregular paths.

As shown in FIG. 18, one way of solving the problem of unequal entrance and exit path lengths is to select the coordinate pairs along the longer path J in equal steps along one axis, e.g., the X-axis, starting at one end S of the path J and ending at the other end V. The y-coordinate at each point S, T, U, V can be computed from the J path equations. The total extent of the path projected on the X-axis is given by $l = x_3 - x_0$. The corresponding path J' on the reverse surface having endpoints S' and V' extends for a distance $l' = x_3' - x_0'$ along the X-axis. The endpoints S and V of path J correspond to endpoints S' and V' on path J'. Intermediate points on path J' corresponding to points T and U on path J can be derived by selecting x-coordinate steps along the X-axis proportioned by the ratio $l'/l$ relative to the steps for the longer path J. In this way, intermediate points T' and U' are interpolated to produce a one-to-one correspondence between points on path J and those on path J', as depicted in step 248. Finally, once the paths are coordinated and normalized, a table of cutting parameters, such as the set of entry points $(x_i, y_i)$ and the corresponding set of exit points $(x_i', y_i')$ or the derived set of entry angles $(\phi_i, \theta_i)$ can be built as in step 250 and stored in the computer's memory 120.

Many changes in the embodiments described herein can be carried out without departing from the scope of the invention. For example, the robot wrist assembly could be mounted to a frame or gantry that is translatable along one or more axes for use with stationary workpieces. Such a version would be particularly useful in cutting heavy or unwieldy workpieces. Accordingly, the scope of the invention is intended to be limited only by the scope of the following claims.

What is claimed as invention is:

1. Apparatus for producing a beveled cut in a workpiece having a substantially planar first surface and a generally parallel second surface, comprising:
   a first frame;
   a cutting knife, pivotably supported by said first frame, for cutting through the workpiece;
   a second frame;
   means, attachable to said second frame, for holding the workpiece such that the first surface faces said cutting knife;
   pivot means attached to one of said first frame and said second frame for pivoting said cutting knife and said workpiece with respect to each other about a pivot point lying in the plane of the first surface;
   translation means attached to one of said first frame and said second frame for translating the workpiece and said cutting knife with respect to each other such that the pivot point remains in the plane of the first surface; and
   a controller, electrically connected to said pivot means and to said translation means, for causing the cutting knife to cut continuously along a preselected entrance cutting path on the first surface by sending translation signals to said translation means, said translation means translating the workpiece with respect to said cutting knife in response to the translation signals,
   said controller further continuously controlling an exit cutting path along the second surface by sending rotation signals to said pivot means, said pivot means pivoting said cutting knife with respect to the workpiece in response to the rotation signals, whereby said cutting knife can make a beveled cut in the workpiece along a preselected path.

2. The apparatus of claim 1, wherein said first frame and said second frame each comprise respective stationary and movable portions, and wherein said first frame and said second frame are spaced a preselected distance from each other.

3. The apparatus of claim 1, wherein said pivot means is attached to said first frame for pivoting said cutting knife about the pivot point.

4. The apparatus of claim 3, wherein said pivot means comprises a first-axis rotation means for rotating said cutting knife about a first axis of rotation lying in the plane of the first surface of the workpiece and a second-axis rotation means for rotating said cutting knife about a second axis of rotation lying in the plane of the first surface of the workpiece and orthogonal to the first axis of rotation.

5. The apparatus of claim 1, wherein said translation means is attached to said second frame for translating said means for holding and, thereby, the workpiece.

6. The apparatus of claim 1, wherein said translation means comprises first means for translating the workpiece with respect to said cutting knife in a first direction and second means for translating the workpiece with respect to said cutting knife in a second direction orthogonal to the first direction, both the first and the second direction lying in a plane parallel to the first surface of the workpiece.

7. The apparatus of claim 1, wherein said second frame comprises a movable portion holding said means for holding along with the workpiece and wherein each of said first and said second means for translating the workpiece respectively comprises:
   a linear track aligned along a respective direction,
   a motor having a geared engagement with said linear track and with the movable portion of said second frame such that energization of said motor causes the movable portion of said second frame to move along said linear track and, thereby, the workpiece to be moved in the respective direction, and
   a motion controller for converting a translation signal from said controller into a motor signal applied to energize said motor to move the workpiece in the respective direction.

8. The apparatus of claim 1, wherein said controller comprises a computer programmed to:
   define the entrance cutting path on the first surface of the workpiece by means of a first set of coordinate values $(x_i, y_i)$ representing cut entrance points of the cutting knife in an x-y coordinate system in the plane of the first surface;
   define a pivot angle relative to the first surface of the workpiece at the associated cut entrance point $(x_i, y_i)$ by means of an associated set of rotation angle values $(\phi_i, \theta_i)$;
   sequentially send translation signals representing consecutive cut entrance points to said translation means; and
   sequentially send rotation signals representing consecutive pivot angles to said pivot means.

9. The apparatus of claim 8, wherein said computer is further programmed to define the exit cutting path on the second surface of the workpiece by means of a second set of coordinate values $(x_i', y_i')$ representing cut exit points in an x'-y' coordinate system in the plane of the second surface and parallel to the x-y coordinate system and to compute the set of rotation angles therefrom according to $\theta_i = \tan^{-1}[x_i - x_i')/d]$ and $\phi_i = \tan^{-1}[(y_i - y_i')/d]$, wherein d is the thickness of the workpiece.

10. The apparatus of claim 8, wherein said controller further comprises a memory for storing said sets of values.

11. The apparatus of claim 8, wherein said computer is further programmed to interpolate said first set of coordinate values from a sparser third set of coordinate values representing the entrance cutting path on the first surface of the workpiece.

12. The apparatus of claim 9, wherein said computer is further programmed to interpolate said first set of coordinate values from a sparser third set of coordinate values representing the entrance cutting path on the first surface of the workpiece and to interpolate said second set of coordinate values from a sparser fourth set of coordinate values representing the exit cutting path on the second surface of said workpiece.

13. The apparatus of claim 12, wherein said computer is programmed to interpolate by deriving a plurality of mathematical functions representing consecutive portions of each cutting path, each of the consecutive portions containing subsets of the sparser sets of coordinate values from which subsets each mathematical function is derived.

14. The apparatus of claim 13, wherein the mathematical function representing each consecutive portion of the cutting path is given by cubic equations of the form $y = a_3 x^3 + a_2 x^2 + a_1 x + a_0$, wherein $a_3$, $a_2$, $a_1$, and $a_0$ are coefficients computed from the coordinate values drawn from the subset of the sparser set of coordinate values contained by the consecutive portion by a curve-fitting approximation technique.

15. The apparatus of claim 9, wherein said computer is further programmed to derive the one of said first and second sets of coordinate values representing the shorter of the entrance and exit cutting paths from a third set of fewer coordinate values also representing the shorter of the entrance and exit cutting paths.

16. The apparatus of claim 8, wherein said computer determines the entrance cutting path by selecting from a two-dimensional array of surface attribute values representing a predetermined physical characteristic on the first surface of the workpiece in the x-y coordinate system those attribute values meeting a predetermined selection criterion, the x-y coordinate values of those attribute values meeting the predetermined selection criterion composing said first set of coordinate values.

17. The apparatus of claim 16, wherein the surface attribute values are reflectance values of a corresponding two-dimensional array of pixels representing a map of the reflectance of the first surface of the workpiece.

18. The apparatus of claim 16, wherein the predetermined selection criterion comprises a reflectance threshold and said computer is further programmed to select the x-y coordinates of those attribute values exceeding the reflectance threshold, contiguous with another attribute value exceeding the reflectance threshold, and contiguous with a further attribute value below the reflectance threshold, such that an entrance cutting path defining the boundary between light and dark regions on the first surface of the workpiece is selected.

19. The apparatus of claim 16, wherein the surface attribute values are maximum reflectance gradient values of a corresponding two-dimensional array of pixels representing a map of the reflectance gradients on the first surface of the workpiece.

20. The apparatus of claim 1, wherein said cutting knife comprises a fluid jet knife producing a high-intensity fluid jet of sufficient pressure to bore through the workpiece.

21. The apparatus of claim 1, wherein said means for holding comprises:
a first portion permanently attached to said second frame at a preselected location,
a second portion supporting the workpiece, and
means for retaining said first portion and said second portion in registration.

22. The apparatus of claim 21, wherein said means for retaining comprises fingers extending from said first portion for releasably gripping said second portion.

23. A method for making an angled cut in a workpiece having a substantially planar first surface and a generally parallel second surface with a cutting tool having a line of cut, comprising the steps of:
(a) defining a first cutting path on the first surface of the workpiece;
(b) defining corresponding cutting angles of the line of cut relative to the first surface along the first cutting path;
(c) positioning the workpiece such that the first surface intersects the line of cut;
(d) translating the workpiece with respect to the line of cut to define a start of the first cutting path;
(e) pivoting the workpiece with respect to the line of cut according to a starting cutting angle;
(f) energizing the cutting tool to cut through the workpiece at the line of cut along intersection points defined by the first cutting path at cutting angles causing the cutting tool to cut the second surface intersected by the line of cut along a second cutting path;
(g) translating the workpiece with respect to the line of cut to advance the intersection point of the line of cut and the first surface along the first cutting path; and
(h) pivoting the workpiece with respect to the line of cut, in coordination with translating the workpiece, according to the cutting angles corresponding to the intersection points along the first and second cutting paths.

24. The method of claim 23, further comprising, before step (b), the step of defining a second cutting path on the second surface of the workpiece.

25. The method of claim 24, wherein, in step (a), the first cutting path is defined by a first set of coordinate pairs $(x_i, y_i)$, and wherein the second cutting path is defined by a second set of coordinate pairs $(x_i', y_i')$, and wherein the corresponding cutting angles defined in step (b) comprise two components $(\phi_i, \theta_i)$ determined according to $$\theta = \tan^{-1}[(x_i - x_i')/d] \text{ and } \phi_i = \tan^{-1}[(y_i - y_i')/d],$$

wherein d is the thickness of the workpiece.

26. The method of claim 23, further comprising, before step (a), the steps of:
i. scanning the first and second surfaces to produce an image of each of the first and second surfaces; and
ii. converting each image into a two-dimensional array of element values, each value representing a surface attribute at an individual coordinate position on a surface of the workpiece;
and wherein step (a) further includes the substep of selecting from the two-dimensional array of element values representing the first surface a set of contiguous values according to a preselected criterion to define the first cutting path.

27. A method for making an angled cut in a workpiece having a substantially planar first surface and a generally parallel second surface with a fluid jet knife, comprising the steps of:
(a) defining an entrance cutting path on the first surface of the workpiece;
(b) defining corresponding entry angles for the fluid jet along the entrance cutting path;
(c) positioning the workpiece such that the first surface faces the fluid jet knife;
(d) translating the workpiece with respect to the fluid jet knife to define a start of the entrance cutting path;
(e) pivoting the workpiece with respect to the fluid jet knife according to a starting entry angle;
(f) emitting a high-intensity fluid stream from the fluid jet knife sufficient to bore through the workpiece and impinging on the first surface of the workpiece along the entrance cutting path at an entry angle causing the fluid jet to exit the second surface along an exit cutting path;
(g) translating the workpiece with respect to the fluid jet knife to advance the entry point of the fluid jet along the defined entrance cutting path; and
(h) pivoting the workpiece with respect to the fluid jet knife, in coordination with translating the workpiece, according to the entry angles corresponding to the points along the entrance and exit cutting paths.

28. The method of claim 27, further comprising, before step (b), the step of defining an exit cutting path on the second surface of the workpiece.

29. The method of claim 28, wherein, in step (a), the entrance cutting path is defined by a first set of coordinate pairs $(x_i, y_i)$, and wherein the exit cutting path is defined by a second set of coordinate pairs $(x_i', y_i')$, and wherein the corresponding entry angles defined in step (b) comprise two components $(\phi_i, \theta_i)$ determined according to $$\theta_i = \tan^{-1}[(x_i - x_i')/d] \text{ and } \phi_i = \tan^{-1}[(y_i - y_i')/d],$$

wherein d is the thickness of the workpiece.

30. The method of claim 27, further comprising, before step (a), the steps of:
  i. producing a video image of each of the first and second surfaces; and
  ii. converting each video image into a two-dimensional array of element values, each value representing the surface reflectance at an individual coordinate position on a surface of the workpiece;

and wherein step (a) further includes the substep of selecting from the two-dimensional array of element values representing the reflectance of the first surface a set of contiguous values according to a preselected criterion to define the entrance cutting path.

* * * * *